(12) United States Patent
Raghavan et al.

(10) Patent No.: US 12,355,512 B2
(45) Date of Patent: Jul. 8, 2025

(54) FOLDABLE USER EQUIPMENT (UE) CONFIGURED TO PROVIDE USER PROMPTS

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 630 days.

(21) Appl. No.: 17/650,061

(22) Filed: Feb. 4, 2022

(65) Prior Publication Data
US 2023/0254016 A1 Aug. 10, 2023

(51) Int. Cl.
| | | |
|---|---|---|
| *H04B 7/0408* | (2017.01) | |
| *G06F 1/16* | (2006.01) | |
| *H04M 1/02* | (2006.01) | |
| *H04W 4/029* | (2018.01) | |
| *H04W 24/10* | (2009.01) | |
| *H04W 28/02* | (2009.01) | |

(52) U.S. Cl.
CPC ......... *H04B 7/0408* (2013.01); *G06F 1/1677* (2013.01); *H04M 1/0214* (2013.01); *H04W 4/029* (2018.02); *H04W 24/10* (2013.01); *H04W 28/0268* (2013.01)

(58) Field of Classification Search
CPC .............. H04B 7/0408; H04B 7/06952; H04B 7/0404; H04B 7/0874; H04B 7/0691; H04B 7/0628; H04B 7/0617; H04B 7/0417; H04B 17/309; H04B 17/12; H04B 1/3838; H04B 17/318; G06F 1/1677; G06F 1/1616; G06F 1/1652; H04M 1/0214; H04M 1/0241; H04W 88/02; H04W 8/24; G08B 7/06
See application file for complete search history.

(56) References Cited

U.S. PATENT DOCUMENTS

| | | | | |
|---|---|---|---|---|
| 10,062,362 | B2 * | 8/2018 | Kwak | G06F 3/147 |
| 10,148,304 | B2 * | 12/2018 | Chang | H04W 52/367 |
| 2012/0223855 | A1 * | 9/2012 | Kurono | G01S 7/2925 |
| | | | | 342/146 |
| 2012/0306910 | A1 * | 12/2012 | Kim | H04N 13/30 |
| | | | | 345/82 |
| 2014/0184489 | A1 * | 7/2014 | Ma | G06F 1/1677 |
| | | | | 345/156 |
| 2016/0085319 | A1 * | 3/2016 | Kim | H04M 1/0268 |
| | | | | 345/156 |

(Continued)

*Primary Examiner* — Cindy Trandai
(74) *Attorney, Agent, or Firm* — Arun Swain

(57) ABSTRACT

This disclosure provides systems, methods and apparatuses for controlling foldable user equipment (UE) functionality according to an indication to change a separation angle between a first portion of the foldable UE and a second portion of the foldable UE. Some examples involve providing a prompt to change the separation angle. In some examples, the indication may be associated with transmission of signals, reception of signals, a downlink data rate, an uplink data rate, or a combination thereof. According to some examples, providing the prompt may involve providing a visual prompt, providing an audio prompt, providing a sensory output, or a combination thereof.

28 Claims, 13 Drawing Sheets

(56) References Cited

U.S. PATENT DOCUMENTS

| | | | | |
|---|---|---|---|---|
| 2017/0357292 | A1* | 12/2017 | Cho | H04M 1/0216 |
| 2019/0320408 | A1* | 10/2019 | Opshaug | G01S 5/12 |
| 2020/0125144 | A1* | 4/2020 | Chung | H04M 1/0216 |
| 2020/0128116 | A1* | 4/2020 | Jang | H04M 1/0243 |
| 2020/0195336 | A1* | 6/2020 | Raghavan | H04B 7/0874 |
| 2020/0320962 | A1* | 10/2020 | Kim | G09G 5/14 |
| 2021/0018957 | A1* | 1/2021 | Cho | G06F 1/1681 |
| 2021/0041912 | A1* | 2/2021 | Eom | G06F 1/1677 |
| 2021/0126992 | A1* | 4/2021 | Jung | H04M 1/0245 |
| 2021/0159990 | A1* | 5/2021 | Meylan | H04B 17/309 |
| 2021/0294926 | A1* | 9/2021 | Duffy | H04W 12/02 |
| 2021/0319894 | A1* | 10/2021 | Sobol | G16H 20/30 |
| 2021/0365165 | A1* | 11/2021 | Chen | G06F 3/0488 |
| 2022/0109472 | A1* | 4/2022 | Na | H04B 7/0456 |
| 2022/0116533 | A1* | 4/2022 | Yan | H04M 1/0216 |
| 2022/0237424 | A1* | 7/2022 | Duffy | G06K 19/0723 |
| 2022/0263238 | A1* | 8/2022 | Huang | H04M 1/0266 |
| 2023/0011847 | A1* | 1/2023 | Sung | H01Q 1/243 |
| 2023/0185508 | A1* | 6/2023 | Chung | G06F 1/1677 |
| | | | | 715/761 |
| 2023/0336863 | A1* | 10/2023 | Cho | H04N 23/633 |
| 2023/0412920 | A1* | 12/2023 | Yoo | H04M 1/0268 |

* cited by examiner

FOLDABLE USER EQUIPMENT (UE) CONFIGURED TO PROVIDE USER PROMPTS

TECHNICAL FIELD

This disclosure relates to foldable user equipment (UE).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in an apparatus configured for wireless communication. In some examples, the apparatus may be, or may include, a foldable UE. The foldable UE may include a first portion, a second portion, an interface system and a control system coupled to the interface system. In some examples, the control system may be configured to obtain an indication to change a separation angle between the first portion and the second portion. In some such examples, the control system may be configured to provide a prompt to change the separation angle.

According to some examples, the interface system may include a user interface system. In some such examples, providing the prompt may involve providing a visual prompt, providing an audio prompt, providing a sensory output, or a combination thereof, via the user interface system.

In some examples, the indication may be associated with transmission of millimeter wave signals, reception of millimeter wave signals, or a combination thereof. According to some examples, obtaining the indication may involve obtaining beam training measurement data. In some examples, the indication may be associated with a downlink data rate, an uplink data rate, or a combination thereof. According to some examples, the indication may be associated with positioning accuracy.

Another innovative aspect of the subject matter described in this disclosure can be implemented in a method for wireless communications via a user equipment (UE). The method may include receiving an indication to change a separation angle between a first portion of the foldable UE and a second portion of the foldable UE. In some examples, the method may involve providing a prompt to change the separation angle. According to some examples, receiving the indication may involve receiving a blockage indication to move at least a portion of a user's hand or body away from at least a portion the foldable UE. In some such examples, the method may involve providing a prompt to move at least the portion of the user's hand or body away from at least the portion of the foldable UE.

Another innovative aspect of the subject matter described in this disclosure can be implemented in a non-transitory computer-readable medium storing code for wireless communications at a UE. The code may include instructions executable by a control system to control a UE to perform a method for wireless communication. The method may include receiving an indication to change a separation angle between a first portion of the foldable UE and a second portion of the foldable UE. In some examples, the method may involve providing a prompt to change the separation angle.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
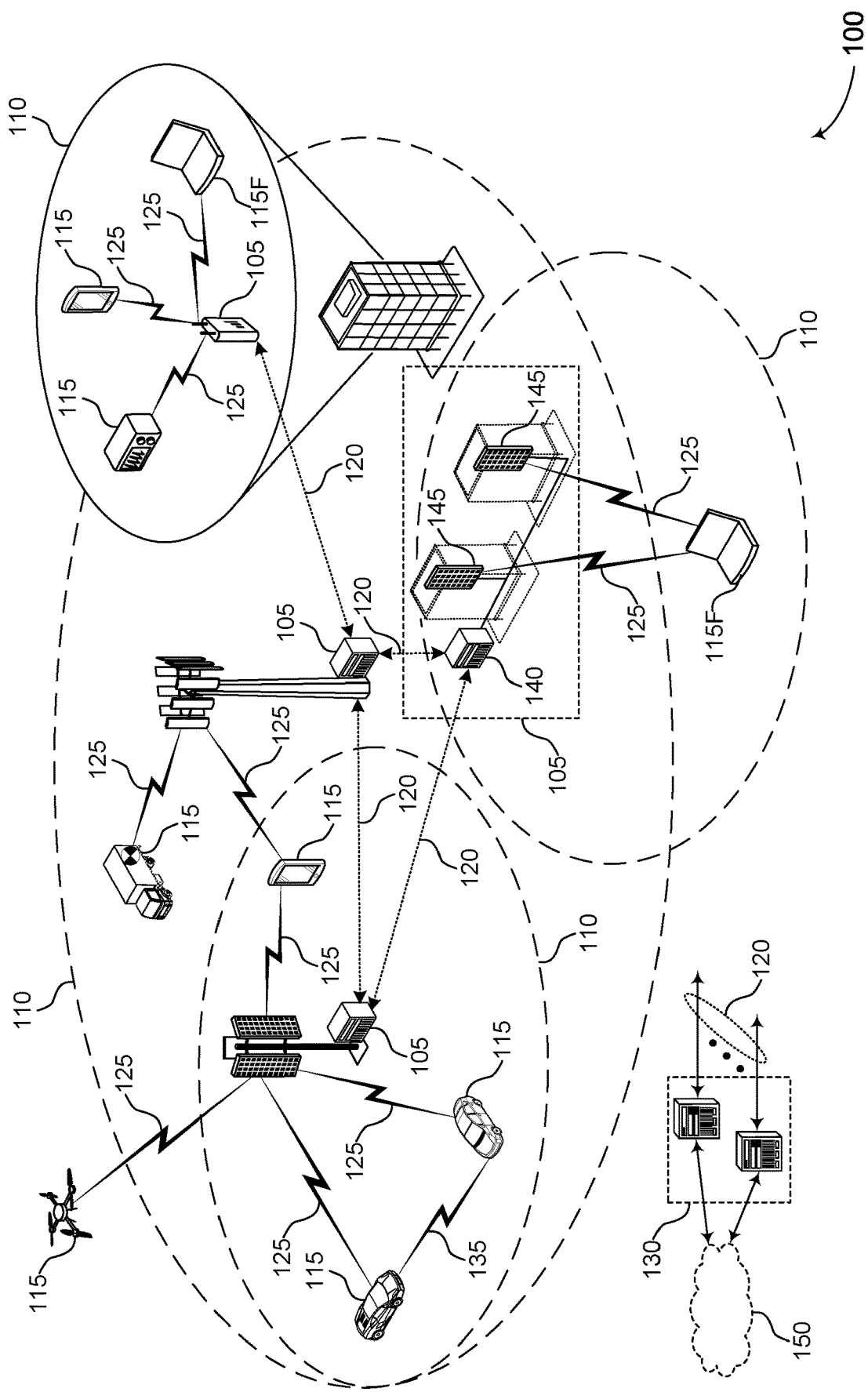
FIG. 1 illustrates an example of a wireless communications system that includes a foldable user equipment (UE) configured to provide user prompts.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G or 5G, or further implementations thereof, technology.

Foldable UEs can provide various advantages as compared to non-foldable UEs. For example, a UE having a foldable display can be operated in different form factors (such as a mobile phone form factor or a tablet form factor), depending on how the device is folded. Other forms of foldable or rollable displays are also being envisioned.

However, such advantages may come with potential challenges. One such potential challenge is that foldable UEs can introduce complexity with respect to the orientation of UE antenna modules. For example, a foldable UE may have a first antenna module residing in a first portion of the UE and a second antenna module residing in a second portion of the UE. The first portion and the second portion may be positioned in a range of separation angles with respect to one another, causing the first antenna module to have a range of different spatial orientations relative to the second antenna module. If the first antenna module has a significantly different spatial orientation relative to the second antenna module (such as more than 30 degrees, more than 45 degrees, etc.), the first antenna module and the second antenna module may receive signals for the same channel at widely varying gain levels.

In some implementations of the present disclosure, a foldable UE may be configured to provide one or more prompts to change a separation angle between a first portion and a second portion of the foldable UE. The first portion and the second portion may, for example, each include at least one antenna module. The one or more prompts may include a visual prompt, an audio prompt, a sensory output, or a combination thereof. The one or more prompts may be provided by the foldable UE itself, by a device configured for communication with the foldable UE (for example, by a wearable device such as a watch or an earbud), or a combination thereof. The one or more prompts may be associated with an indication to change a separation angle between the first portion and the second portion. For example, the one or more prompts may be associated with UE measurements corresponding to transmission of signals, reception of signals, a downlink data rate, an uplink data rate, beam training, or a combination thereof.

Particular implementations of the subject matter described in this disclosure can be implemented to realize one or more of the following potential advantages. Some disclosed implementations may provide a user prompt indicating that changing a separation angle of a foldable UE would result in enhanced UE performance, such as higher data transmission or reception rates, better positioning accuracy, etc. If the user seeks, for example, a higher download rate, the user may obtain an enhanced user experience by changing the separation angle according to the prompt. Some disclosed examples may provide a user interface, such as a graphical user interface (GUI), that indicates a current performance level of a UE (such as the current data transmission or reception rate) corresponding with a current separation angle. Some such examples may allow a user to select a separation angle that provides both an acceptable UE performance level and an acceptable foldable UE configuration, according to user preferences.

FIG. 1 illustrates an example of a wireless communications system 100 that includes one or more foldable UEs configured to provide user prompts. The wireless communications system 100 may include one or more base stations (BSs) 105, one or more UEs 115, and a core network 130. In this example, the wireless communications system 100 includes one or more foldable UEs 115F configured to provide user prompts. The term "UE 115" as used herein may refer to various types of user equipment, including both foldable and a non-foldable UEs, automobiles (or components thereof), autonomous vehicles, etc. In some implementations, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (for example, mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a geographic coverage area 110 over which the UEs 115 and the BS 105 may establish one or more communication links 125. The geographic coverage area 110 may be an example of a geographic area over which a BS 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (for example, core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (for example, via an S1, N2, N3, or another interface). The BSs 105 may communicate with one another over the backhaul links 120 (for example, via an X2, Xn, or another interface) either directly (for example, directly between BSs 105), or indirectly (for example, via core network 130), or both. In some implementations, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other implementations.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other implementations, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation (CA) or multi-carrier operation. A UE 115 may be configured with multiple downlink component carriers and one or more uplink component carriers according to a CA configuration. CA may be used with both frequency division duplexing (FDD) and time division duplexing (TDD) component carriers.

In some implementations (for example, in a CA configuration), a carrier also may have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone (SA) mode where initial acquisition and connection may be conducted by the UEs 115 via the carrier, or the carrier may be operated in a non-standalone (NSA) mode where a connection is anchored using a different carrier (for example, of the same or a different radio access technology).

The communication links 125 shown in the wireless communications system 100 may include uplink transmissions from a UE 115 to a BS 105, or downlink transmissions from a BS 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some implementations the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the BSs 105, the UEs 115, or both) may have hardware configurations that support communications over a particular carrier bandwidth or may be configurable to support communications over one of a set of carrier bandwidths. In some implementations, the wireless communications system 100 may include BSs 105 or UEs 115 that support simultaneous communications via carriers associated with multiple carrier bandwidths. In some implementations, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (for example, a duration of one modulation symbol) and one subcarrier, where the symbol period and subcarrier spacing are inversely related. The quantity of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some implementations, a UE 115 may be configured with multiple BWPs. In some implementations, a single BWP for a carrier may be active at a given time and communications for the UE 115 may be restricted to one or more active BWPs.

The time intervals for the BSs 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some implementations, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some implementations, the TTI duration (for example, the number of symbol periods in a TTI) may be variable. Additionally, or alternatively, the smallest scheduling unit of the wireless communications system 100 may be dynamically selected (for example, in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each BS 105 may provide communication coverage via one or more cells, for example a macro cell, a small cell, a hot spot, or other types of cells, or any combination thereof. The term "cell" may refer to a logical communication entity used for communication with a BS 105 (for example, over a carrier) and may be associated with an identifier for distinguishing neighboring cells (for example, a physical cell identifier (PCID), a virtual cell identifier (VCID), or others). In some implementations, a cell also may refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the BS 105. For example, a cell may be or include a building, a subset of a building, or exterior spaces between or overlapping with geographic coverage areas 110, among other implementations.

A macro cell generally covers a relatively large geographic area (for example, several kilometers in radius) and may allow unrestricted access by the UEs 115 with service subscriptions with the network provider supporting the macro cell. A small cell may be associated with a lower-powered BS 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A BS 105 may support one or multiple cells and also may support communications over the one or more cells using one or multiple component carriers.

In some implementations, a carrier may support multiple cells, and different cells may be configured according to different protocol types (for example, MTC, narrowband IoT (NB-IoT), enhanced mobile broadband (eMBB)) that may provide access for different types of devices.

In some implementations, a BS 105 may be movable and therefore provide communication coverage for a moving geographic coverage area 110. In some implementations, different geographic coverage areas 110 associated with different technologies may overlap, but the different geographic coverage areas 110 may be supported by the same BS 105. In some other implementations, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

The wireless communications system 100 may support synchronous or asynchronous operation. For synchronous operation, the BSs 105 may have similar frame timings, and transmissions from different BSs 105 may be approximately aligned in time. For asynchronous operation, the BSs 105 may have different frame timings, and transmissions from different BSs 105 may, in some implementations, not be aligned in time. The techniques described herein may be used for either synchronous or asynchronous operations.

Some UEs 115 may be configured to employ operating modes that reduce power consumption, such as half-duplex communications (for example, a mode that supports one-way communication via transmission or reception, but not transmission and reception simultaneously). In some implementations, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some implementations, groups of the UEs 115 communicating via D2D communications may utilize a one-to-many (1:M) system in which each UE 115 transmits to every other UE 115 in the group. In some implementations, a BS 105 facilitates the scheduling of resources for D2D communications. In some other implementations, D2D communications are carried out between the UEs 115 without the involvement of a BS 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (for example, radio heads and ANCs) or consolidated into a single network device (for example, a BS 105). In various implementations, a BS 105, or an access network entity 140, or a core network 130, or some subcomponent thereof, may be referred to as a network entity.

As described herein, a BS 105 may include components that are located at a single physical location or components located at various physical locations. In examples in which the BS 105 includes components that are located at various physical locations, the various components may each perform various functions such that, collectively, the various components achieve functionality that is similar to a BS 105 that is located at a single physical location. As such, a BS 105 described herein may equivalently refer to a standalone BS 105 or a BS 105 including components that are located at various physical locations or virtualized locations. In some implementations, such a BS 105 including components that are located at various physical locations may be referred to as or may be associated with a disaggregated radio access network (RAN) architecture, such as an Open RAN (O-RAN), Distributed RAN (D-RAN), or Virtualized RAN (VRAN) architecture. In some implementations, such components of a BS 105 may include or refer to one or more of a central unit (CU), a distributed unit (DU), or a radio unit (RU).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the lower frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some implementations, the wireless communications system 100 may support millimeter wave (mmW) communications between the UEs 115 and the BSs 105, and EHF antennas of the respective devices may be smaller and more closely spaced than UHF antennas. In some implementations, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some implementations, operations in unlicensed bands may be based on or associated with a CA configuration in conjunction with component carriers operating in a licensed band (for example, LAA). Operations in unlicensed spectrum may include downlink transmissions, uplink transmissions, P2P transmissions, or D2D transmissions, among other transmissions.

A BS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The BSs 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (for example, a BS 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A BS 105 or a UE 115 may use beam sweeping techniques as part of beam forming operations. For example, a BS 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a BS 105 multiple times in different directions. For example, the BS 105 may transmit a signal according to different beamforming weight sets associated with different directions of transmission. Transmissions in different beam directions may be used to identify (for example, by a transmitting device, such as a BS 105, or by a receiving device, such as a UE 115) a beam direction for later transmission or reception by the BS 105.

Some signals, such as data signals associated with a particular receiving device, may be transmitted by a BS 105 in a single beam direction (for example, a direction associated with the receiving device, such as a UE 115). In some implementations, the beam direction associated with transmissions along a single beam direction may be determined, estimated or ascertained based on or in accordance with a signal that was transmitted in one or more beam directions. For example, a UE 115 may receive one or more of the signals transmitted by the BS 105 in different directions and may report to the BS 105 an indication of the signal that the UE 115 received with a highest signal quality or an otherwise acceptable signal quality.

In some implementations, transmissions by a device (for example, by a BS 105 or a UE 115) may be performed using multiple beam directions, and the device may use a combination of digital precoding or radio frequency beamforming to generate a combined beam for transmission (for example, from a BS 105 to a UE 115). The UE 115 may report feedback that indicates precoding weights for one or more beam directions, and the feedback may correspond to a configured number of beams across a system bandwidth or one or more sub-bands. The BS 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a BS 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the BS 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some implementations, a receiving device may use a single receive configuration to receive along a single beam direction (for example, when receiving a data signal). The single receive configuration may be aligned in a beam direction determined, estimated or ascertained based on or in accordance with listening according to different receive configuration directions (for example, a beam direction determined or estimated to have a highest signal strength, highest signal-to-noise ratio (SNR), or otherwise acceptable signal quality based on or in accordance with listening according to multiple beam directions).

The UEs 115 and the BSs 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the medium access control (MAC) layer in poor radio conditions (for example, low signal-to-noise conditions). In some implementations, a device may support same-slot HARQ feedback, where the device may provide HARQ feedback in a specific slot for data received in a previous symbol in the slot. In some other implementations, the device may provide HARQ feedback in a subsequent slot, or according to some other time interval.

Figure 2:
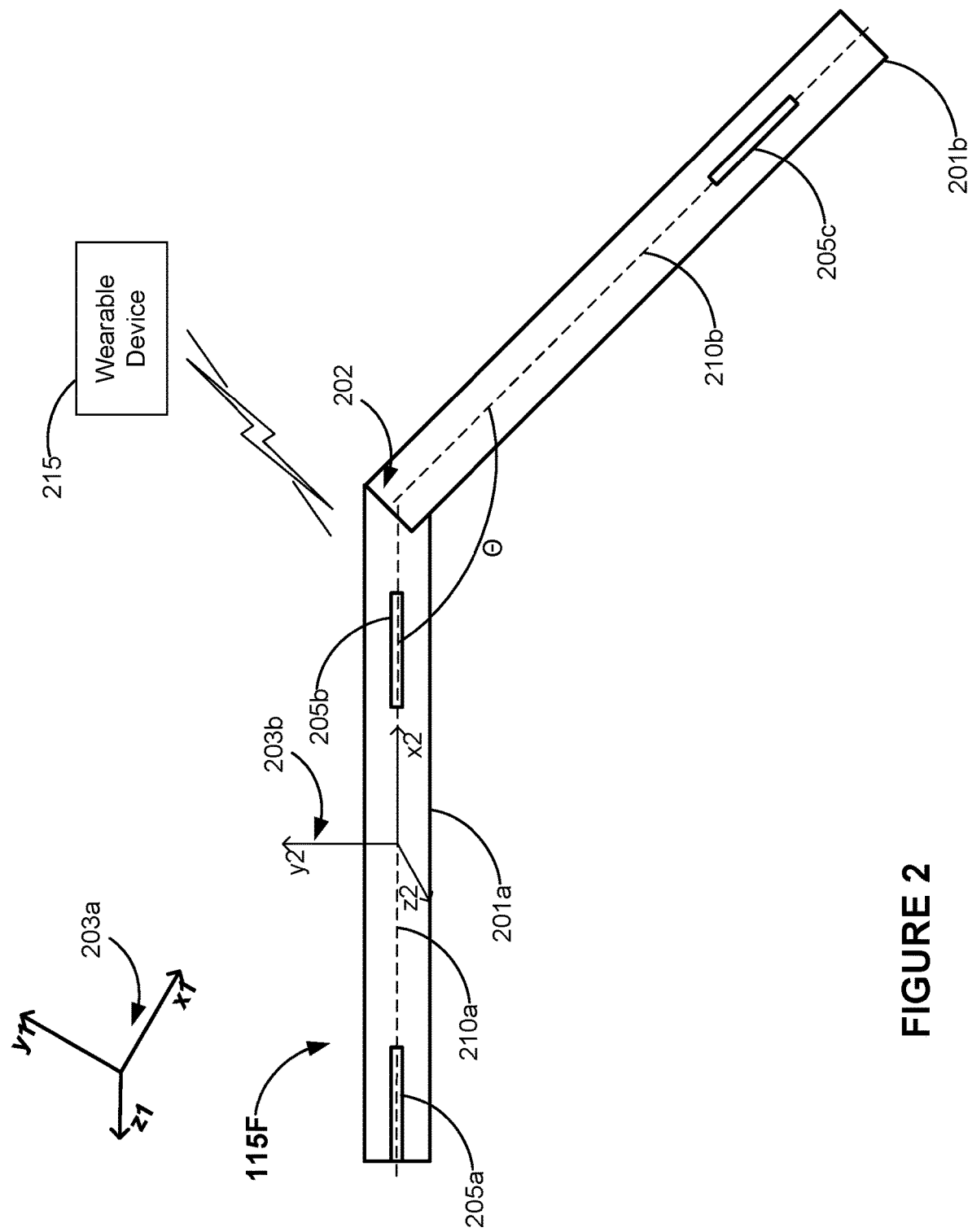
FIG. 2 illustrates an example of a foldable UE configured to provide user prompts.

FIG. 2 illustrates an example of a foldable UE configured to provide user prompts. In this example, FIG. 2 also illustrates a wearable device 215 that is configured for wireless communication with the foldable UE 115F. The wearable device 215 may, for example, be a watch, one or more earbuds, headphones, another accessory device, etc. The numbers, types and arrangements of elements shown in the figures provided herein, including but not limited to FIG. 2, are merely examples. Other examples may include different elements, different arrangements of elements, or combinations thereof.

In this example, the foldable UE 115F includes a first portion 201a and a second portion 201b, which are connected by a hinge area 202 in this example. According to this example, the first portion 201a and the second portion 201b may be rotated to a variety of separation angles $\Theta$ relative to one another. In this example, the separation angles $\Theta$ are measured with reference to a first axis 210a, corresponding to the first portion 201a, and a second axis 210b, corresponding to the second portion 201b. In some other examples, the separation angles $\Theta$ may be measured with reference to other elements of the first portion 201a and the second portion 201b, such as outer surfaces of the first portion 201a and the second portion 201b.

According to example shown in FIG. 2, the orientation of the foldable UE 115F may be determined, estimated, calculated or ascertained relative to a reference coordinate system 203a. In some examples, the reference coordinate system 203a may be a global coordinate system. In this example, the orientation of the foldable UE 115F may be determined, estimated, calculated or ascertained with reference to a local coordinate system 203b. According to this example, the local coordinate system 203b corresponds to the first portion 201a. In this particular example, the x2 axis of the local coordinate system 203b corresponds to the first axis 210a of the first portion 201a. Accordingly, the orientation of the first portion 201a relative to the reference coordinate system 203a may be determined, estimated, calculated or ascertained by a coordinate transform between the local coordinate system 203b and the reference coordinate system 203a.

According to this example, the reference coordinate system 203a and the local coordinate system 203b are cartesian coordinate systems. The x1, y1 and z1 axes of the reference coordinate system 203a define three corresponding global reference planes. The x2, y2 and z2 axes of the local coordinate system 203b define three corresponding local reference planes. In some other examples, the reference coordinate system 203a, the local coordinate system 203b or both may be other coordinate systems, such as spherical coordinate systems or cylindrical coordinate systems.

In some implementations, the foldable UE 115F includes an orientation sensing system configured for sensing an orientation of at least a portion of the foldable UE relative to a local reference plane or a global reference plane. The orientation sensing system may, in some instances, be an instance of the orientation sensing system 620 that is described with reference to FIG. 6. In some such implementations, the orientation sensing system may include one or more gyroscopes, accelerometers, or combinations thereof. In some implementations, the orientation sensing system may include one or more magnetometers. In some examples, the first portion 201a and the second portion 201b each may include a portion of the orientation sensing system. In some such examples, the orientation sensing system may be configured to estimate, calculate or ascertain the separation angle $\Theta$. According to some examples, a control system of the foldable UE 115F may be configured to estimate, calculate or ascertain the separation angle $\Theta$ according to signals from the orientation sensing system. In some examples, a control system of the foldable UE 115F may be configured to estimate, calculate or ascertain the orientation of at least a portion of the foldable UE 115F relative to at least a portion of the reference coordinate system 203a (such as a reference plane of the reference coordinate system 203a) according to signals from the orientation sensing system.

The foldable UE 115F includes at least antenna modules 205a, 205b and 205c. In some implementations, the foldable UE 115F includes additional antenna modules, which may reside on portions of the foldable UE 115F that are not shown in FIG. 2. In alternative implementations, the foldable UE 115F may include more or fewer antenna modules.

According to some implementations, one or more of the antenna modules 205a, 205b and 205c may be configured for different frequencies or frequency bands. In one such implementation, the antenna modules 205a and 205c may be configured for a first frequency band (which may be referred to as FRx) and the antenna module 205b may be configured for a second frequency band (which may be referred to as FRy). In some implementations, FRx or FRy may be FR2 (from 24.25 GHz to 52.6 GHz), FR2x (from 52.6 GHz to 71 GHz), FR3 (7.125 GHz to 24.25 GHZ), FR4 (from 52.6 GHz to 114.25 GHZ) or FR5 (from 114.25 GHz to 275 or 300 GHz).

In some implementations, antenna elements within the same antenna module may be used for communicating at different frequencies. In some such implementations, one or more of the antenna modules 205a, 205b and 205c may include antenna elements that are spaced for multiple frequency bands.

The performance of each of the antenna modules 205a, 205b and 205c will generally vary according to the orientation of each antenna module. For example, suppose that antenna modules 205a and 205c are configured for FRx and antenna module 205b is configured for FRy. At some separation angles $\Theta$ (such as separation angles $\Theta$ between 45 degrees and 135 degrees), if antenna module 205a is in an optimal position for receiving an FRx signal at a high reference signal received power (RSRP) level or signal strength, it is likely that antenna module 205c will not be positioned to receive the same FRx signal at a high RSRP level. However, at some separation angles Θ and orientations of the foldable UE 115F, the positions of antenna modules 205a and 205c may be such that both antenna modules can receive the same FRx signal at an acceptable RSRP level. Similarly, at some separation angles Θ and orientations of the foldable UE 115F, antenna modules 205a and 205c may be configured to cooperatively transmit FRx signals at an acceptable power level. Similarly, at some separation angles (and orientations of the foldable UE 115F, antenna modules 205a-205c may be configured to provide relatively higher positioning accuracy.

Accordingly, the foldable UE 115F may be able to optimize signal reception, transmission and positioning accuracy at particular separation angles Θ and orientations. In some implementations, the foldable UE 115F may be configured to provide a prompt to change the separation angle Θ. Alternatively, or additionally, the foldable UE 115F may be configured to provide a prompt to change the orientation of the foldable UE 115F. In some such examples, the prompt may indicate that the foldable UE 115F should be rotated around the x2, y2 or z2 axis. The prompt may be associated with receiving an indication to change the separation angle Θ between the first portion 201a and the second portion 201b. Providing the prompt may involve providing a visual prompt, providing an audio prompt, providing a sensory output, or a combination thereof, via the user interface system. In some examples, one or more prompts may be provided by the foldable UE itself, by a device configured for communication with the foldable UE (for example, by the wearable device 215), or a combination thereof.

Figure 6:
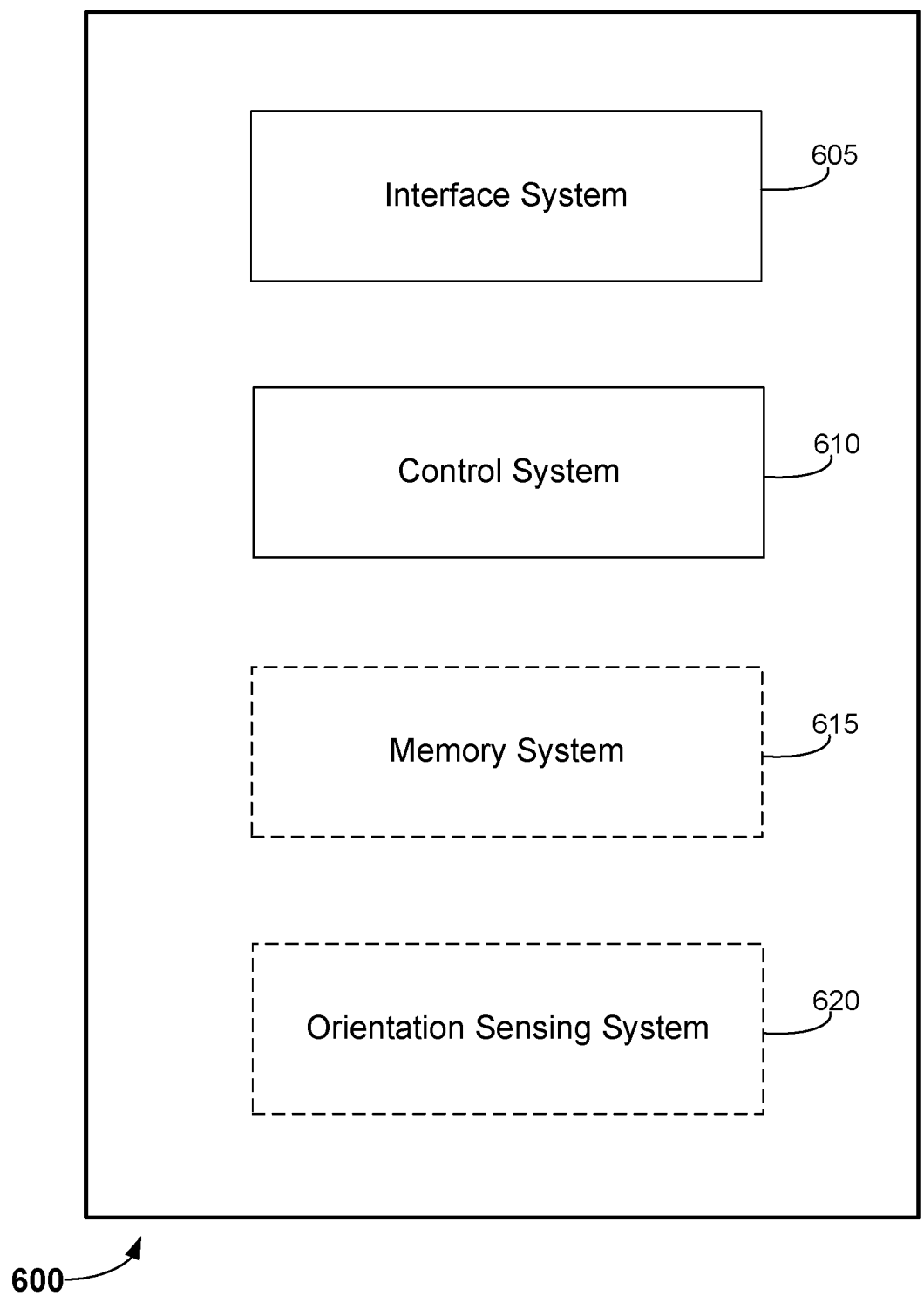
FIG. 6 illustrates an example apparatus that supports functionality of a foldable UE.

In some such implementations, the foldable UE 115F may include a control system, such as the control system 610 that is described herein with reference to FIG. 6. According to some such implementations, the foldable UE 115F may include an interface system, such as the interface system 605 that is described herein with reference to FIG. 6. According to some examples, the control system may send a signal to the wearable device 215, via the interface system, to provide one or more audio prompts, one or more visual prompts, one or more haptic feedback prompts, or combinations thereof. In some implementations, the interface system may include a user interface system. The user interface system may include a display system, a loudspeaker system, a sensory feedback system (such as a haptic feedback system configured to provide sensory output), or a combination thereof. In some examples, the control system may control the user interface system to provide the prompt.

In some examples, the indication may be associated with transmission of signals, reception of signals, or a combination thereof. The signals may, in some instances, be millimeter wave signals. For example, the indication may be associated with measured RSRP of millimeter wave signals received by one of more of the antenna modules 205a-205c. In some instances, the indication may be associated with a downlink data rate, an uplink data rate, or a combination thereof. In some examples, the indication may be a quality of service indication.

According to some examples, the indication may be associated with beam training measurement data received by the foldable UE 115F. In some such examples, the beam training measurement data may be received from different parts of the foldable UE 115F at each separation angle of a plurality of separation angles. According to some examples, the foldable UE 115F may include a plurality of (such as two or more) antenna modules. In some such examples, receiving the beam training measurement data may involve receiving the beam training measurement data via each antenna module of the plurality of antenna modules.

Positioning of UEs has been of interest for some time in standard specification efforts. Angle-based positioning has traditionally been network-based, for example based on DL AoD (downlink angle of departure), DL ZoD (downlink zenith angle of departure), UL AoA (uplink angle of arrival), UL ZoA (uplink zenith angle of arrival), or combinations thereof. Information regarding beam shapes, patterns or combinations thereof used by a Transmission/Reception Point (TRP) (such as a BS 105 or a portion thereof) for positioning reference signals (PRS) may be transmitted to a positioning server, such as a Location Management Function (LMF) server, which may transmit corresponding information (such as measurement information) to a foldable UE 115F. In some examples, the foldable UE 115F may be configured to report reference signal measurements, e.g., RSRP, to the TRP, the positioning server, or both. In some examples, the TRP, the positioning server, or both, may determine position estimates for the foldable UE 115F.

If the foldable UE 115F includes relatively larger antenna arrays, more antenna modules (or both) than have been included in some previously-deployed UEs 115, angle measurements may be made relatively more accurately at the foldable UE 115F. For example, at FR2 frequencies, arrays of size 8×8 or 64×16 antenna elements at the TRP may be used while some foldable UEs 115F may include antenna modules having 2×2 or 4×1 antenna elements. (Other examples of foldable UEs 115F may include different antenna modules.) At higher frequencies, however, such as FR4 frequencies, more antenna elements may be provided in the same size antenna module than for FR2. For example, a 14 GHz-wide bandwidth of 57 GHZ-71 GHz is available in some countries, allowing significant performance (such as beamforming) improvements. Beamforming with relatively larger antenna arrays leads to smaller beamwidths, so that foldable UEs 115F, even with small form factors, may provide sufficiently narrow beamwidths to provide accurate angle of arrival (AoA) or angle of departure (AoD) measurements for UE-side positioning. UE-side positioning may be used independently or to complement network-side (such as TRP-based or positioning server-based) positioning. By supplementing the measurements available for network-side positioning with UE-based measurements, better position estimation accuracy may be achieved. For example, averaging of measurements may be able to reduce noise. In some examples, diversity of measurements may help reveal discrepancies or inconsistencies with network-side measurements.

Changes in configuration caused by differing separation angles of a foldable UE 115F may lead to different operational characteristics such as attenuation, individual antenna radiation patterns, beam patterns (corresponding to multiple antenna modules), etc. For example, antenna modules may be separated in one configuration and may remain adjacent to each other in another configuration, to effectively provide a larger antenna array. Therefore, a foldable UE 115F may be capable of making AoA and AoD measurements relatively more accurately in some configurations (such as some separation angles, orientations, or combinations thereof) and relatively less accurately in other configurations. Less-accurate AoA measurements, AoD measurements, or both, generally correspond with lower positioning accuracy.

Accordingly, in some examples an indication to change a separation angle between the first portion and the second portion of a foldable UE 115F may be associated with positioning accuracy. According to some such examples, receiving the indication may involve receiving, by the foldable UE 115F, positioning measurement data. In some examples, the positioning measurement data may be received at each of a plurality of separation angles. According to some examples, receiving the positioning measurement data may involve receiving the positioning measurement data via each antenna module of a plurality of antenna modules of the foldable UE 115F.

Figure 3A:
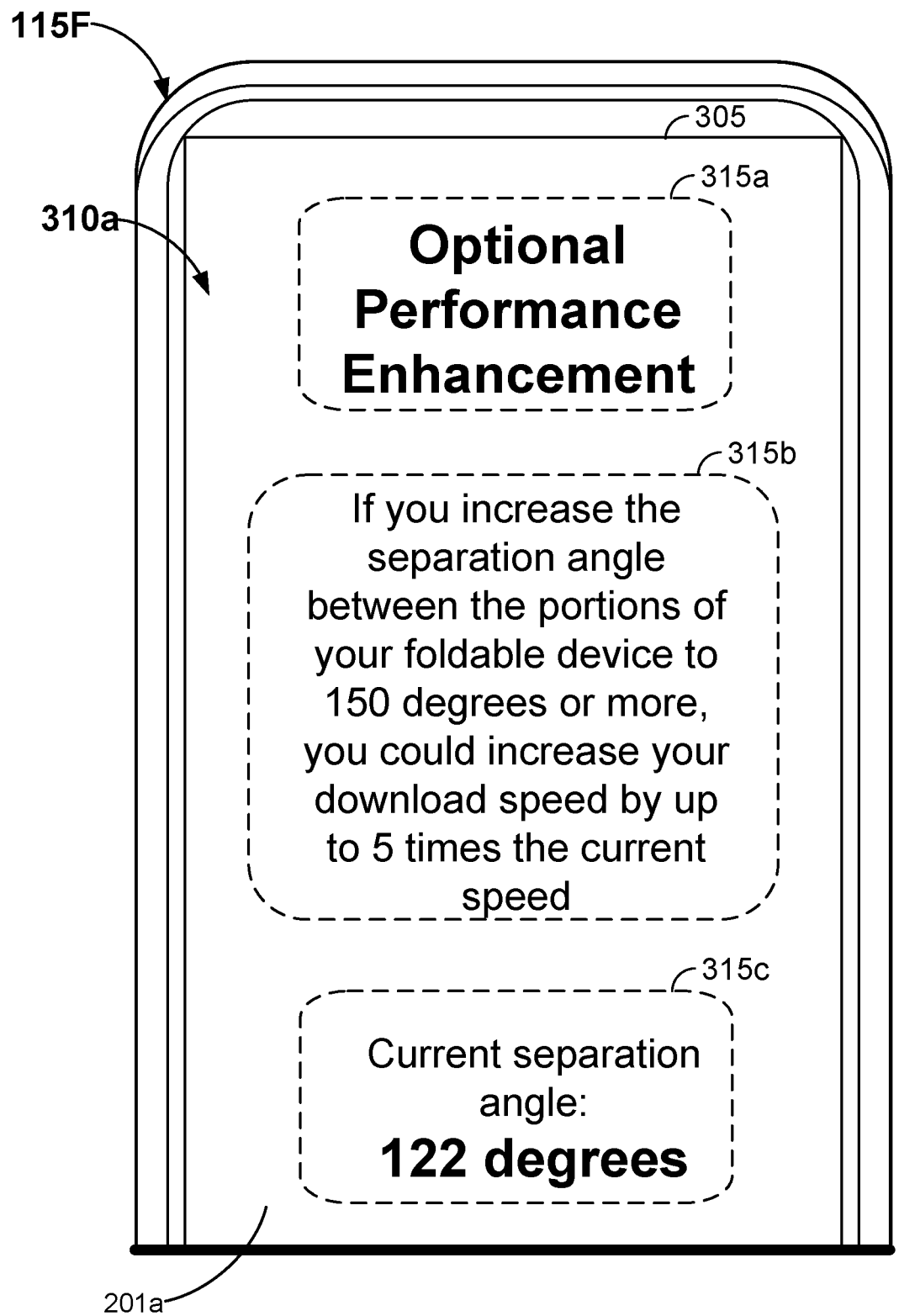
FIG. 3A illustrates examples of user prompts that may be provided by a foldable UE.

FIG. 3A illustrates examples of user prompts that may be provided by a foldable UE. In this example, the user prompts include textual prompts presented on a display device 305 of the foldable UE 115F. According to this example, the display device 305 resides in the first portion 201a of the foldable UE 115F. In some other examples, the display device may reside in another part of the foldable UE 115F, such as the second portion 201b that is shown in FIG. 2. According to some examples, the display device may reside in a wearable device, such as the wearable device 215 of FIG. 2. In some such examples, only a portion of the graphical user interface (GUI) 310a may be displayed via the wearable device.

According to this example, the user prompts are associated with receipt of an indication to change a separation angle between the first portion and the second portion. In this example, the user prompts are associated with receipt of an indication to increase a separation angle between the first portion and the second portion. In some such examples, the user prompts may be associated with receipt of an indication relating to the reception of wireless signals, such as millimeter wave signals, relating to a downlink data rate, or a combination thereof. For example, the user prompts may be associated with measurements obtained by the foldable UE 115F relating to the reception of wireless signals, such as millimeter wave signals, relating to a downlink data rate, or a combination thereof.

According to this example, at least some of the user prompts are presented in the GUI 310a. In some implementations, the foldable UE 115F, a wearable device, or both, may be configured to provide alternative prompts such as audio prompts, sensory output, or a combination thereof. Such alternative prompts may be presented in combination with the presentation of one or more visual prompts (such as a GUI) or without a corresponding presentation of one or more visual prompts, depending on the particular implementation.

In this example, the GUI 310a includes visual prompts presented in areas 315a, 315b and 315c of the display device 305. According to this example, area 315a includes a textual user prompt indicating an optional performance enhancement indication. According to this example, area 315b includes another textual user prompt indicating details of how to attain the optional performance enhancement referenced in the area 315a: here, a message is presented in area 315b indicating that if the user increases the separation angle between portions of the foldable UE 115F to 150 degrees or more, the download speed provided by the foldable UE 115F could increase by up to 5 times the current speed.

In some examples, the GUI 310a (or another GUI disclosed herein) may include a user prompt regarding whether or not to change the orientation of the first portion 201a or the second portion 201b while changing the separation angle. For example, if the foldable UE 115F receives an indication that an antenna module of the first portion 201a is receiving signals at a high RSRP and that an antenna module of the second portion 201b is receiving signals at a low RSRP, the GUI 310a may include a user prompt to maintain the orientation of the first portion 201a while changing the separation angle.

In this example, area 315c indicates the current separation angle between the first portion 201a and the second portion 201b of the foldable UE 115F. This information may be helpful to many users, in part because the separation angle could be measured in more than one way and in part because many users may not be able to accurately estimate the separation angle.

Figure 3B:
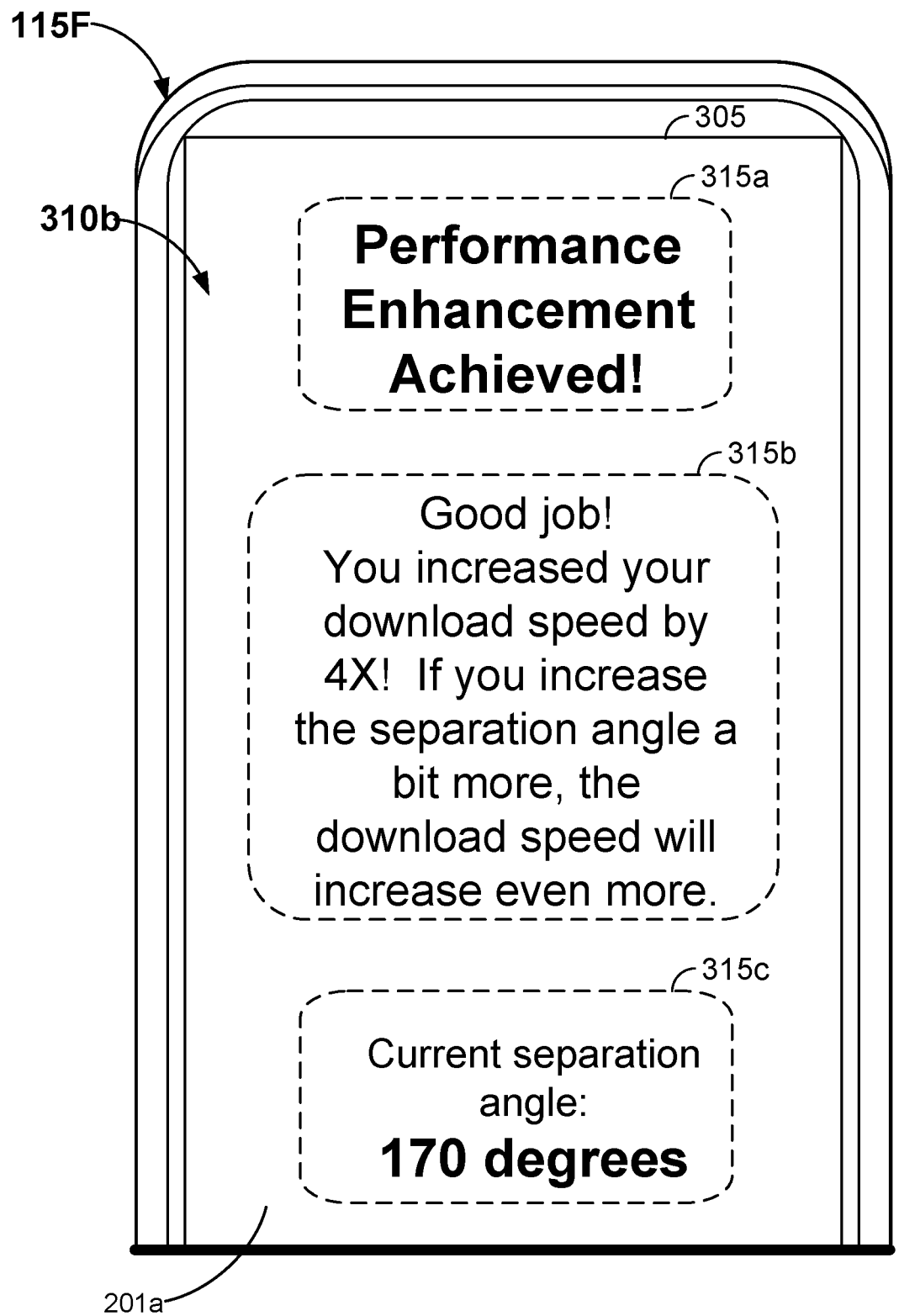
FIG. 3B illustrates additional examples of user prompts that may be provided by a foldable UE

FIG. 3B illustrates additional examples of user prompts that may be provided by a foldable UE. In this example, the GUI 310b includes visual prompts presented in areas 315a, 315b and 315c of the display device 305. In some instances, the GUI 310b may be presented after the GUI 310a of FIG. 3A. According to this example, the GUI 310b is being presented associated with a user having increased the separation angle between the first portion 201a and the second portion 201b of the foldable UE 115F from 122 degrees to 170 degrees.

According to this example, a textual user prompt is being presented in area 315a indicating that some type of performance enhancement has been achieved. According to this example, area 315b includes another textual user prompt indicating details of the performance enhancement (in this example, a 4× increase in download speed) and an indication that additional performance enhancements could be attained if the separation angle were increased. In this example, area 315c indicates that the current separation angle between the first portion 201a and the second portion 201b is 170 degrees.

Figure 3C:
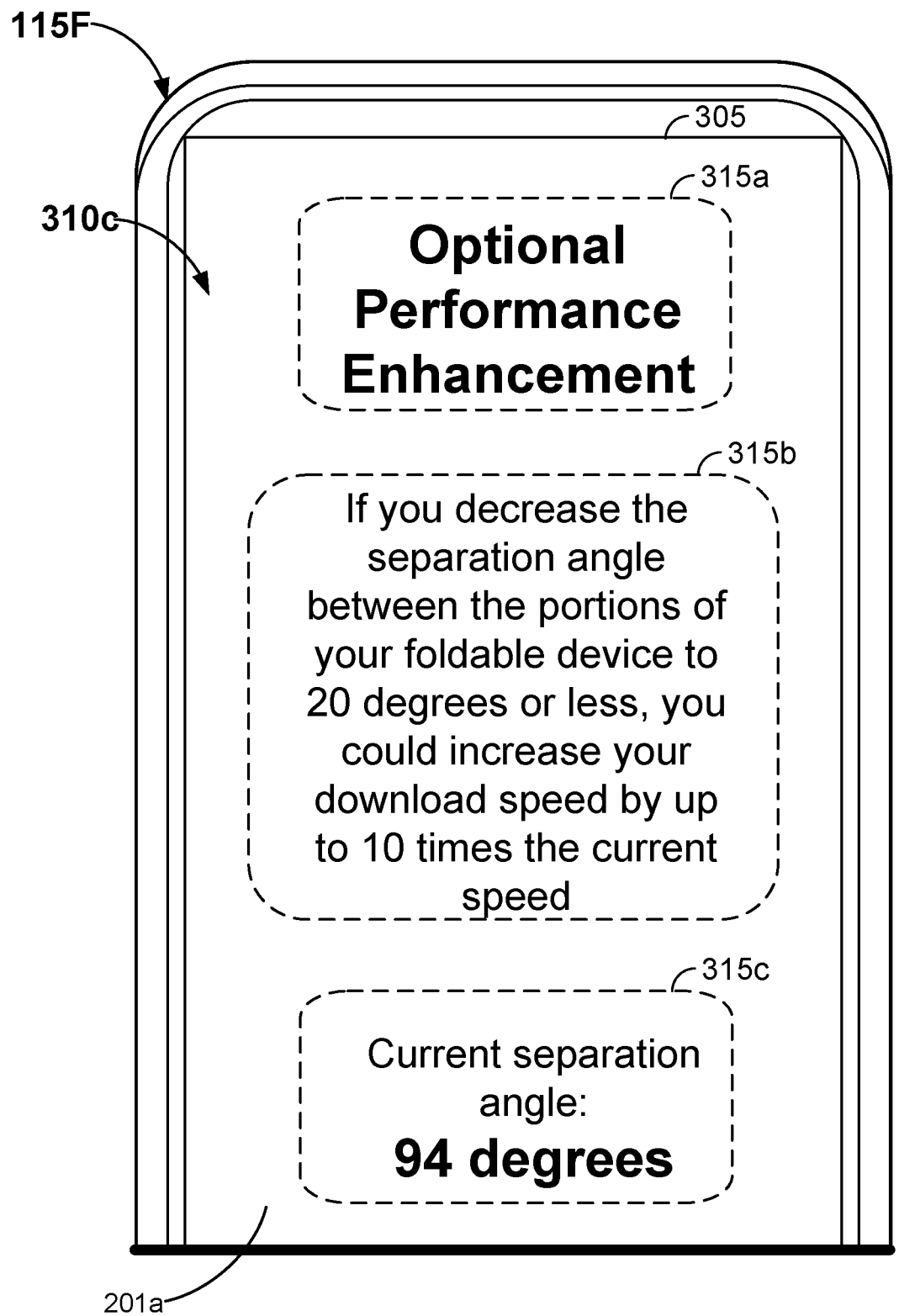
FIG. 3C illustrates additional examples of user prompts that may be provided by a foldable UE.

FIG. 3C illustrates additional examples of user prompts that may be provided by a foldable UE. In this example, the GUI 310c includes visual prompts presented in areas 315a, 315b and 315c of the display device 305. According to this example, the user prompts are associated with receipt of an indication to change a separation angle between the first portion and the second portion. In this example, the user prompts are associated with receipt of an indication to decrease a separation angle between the first portion and the second portion. In some such examples, the user prompts may be associated with receipt of an indication relating to the reception of wireless signals, such as millimeter wave signals, relating to a downlink data rate, or a combination thereof. For example, the user prompts may be associated with measurements received by the foldable UE 115F relating to the reception of wireless signals, such as millimeter wave signals, relating to a downlink data rate, or a combination thereof.

In this example, the GUI 310c includes visual prompts presented in areas 315a, 315b and 315c of the display device 305. According to this example, area 315a includes a textual user prompt indicating an optional performance enhancement indication. According to this example, area 315b includes another textual user prompt indicating details of how to attain the optional performance enhancement referenced in the area 315a: here, a message is presented in area 315b indicating that if the user decreases the separation angle between portions of the foldable UE 115F to 20 degrees or less, the download speed provided by the foldable UE 115F could increase by up to 10 times the current speed. In this example, area 315c indicates that the current separation angle is 94 degrees.

Figure 3D:
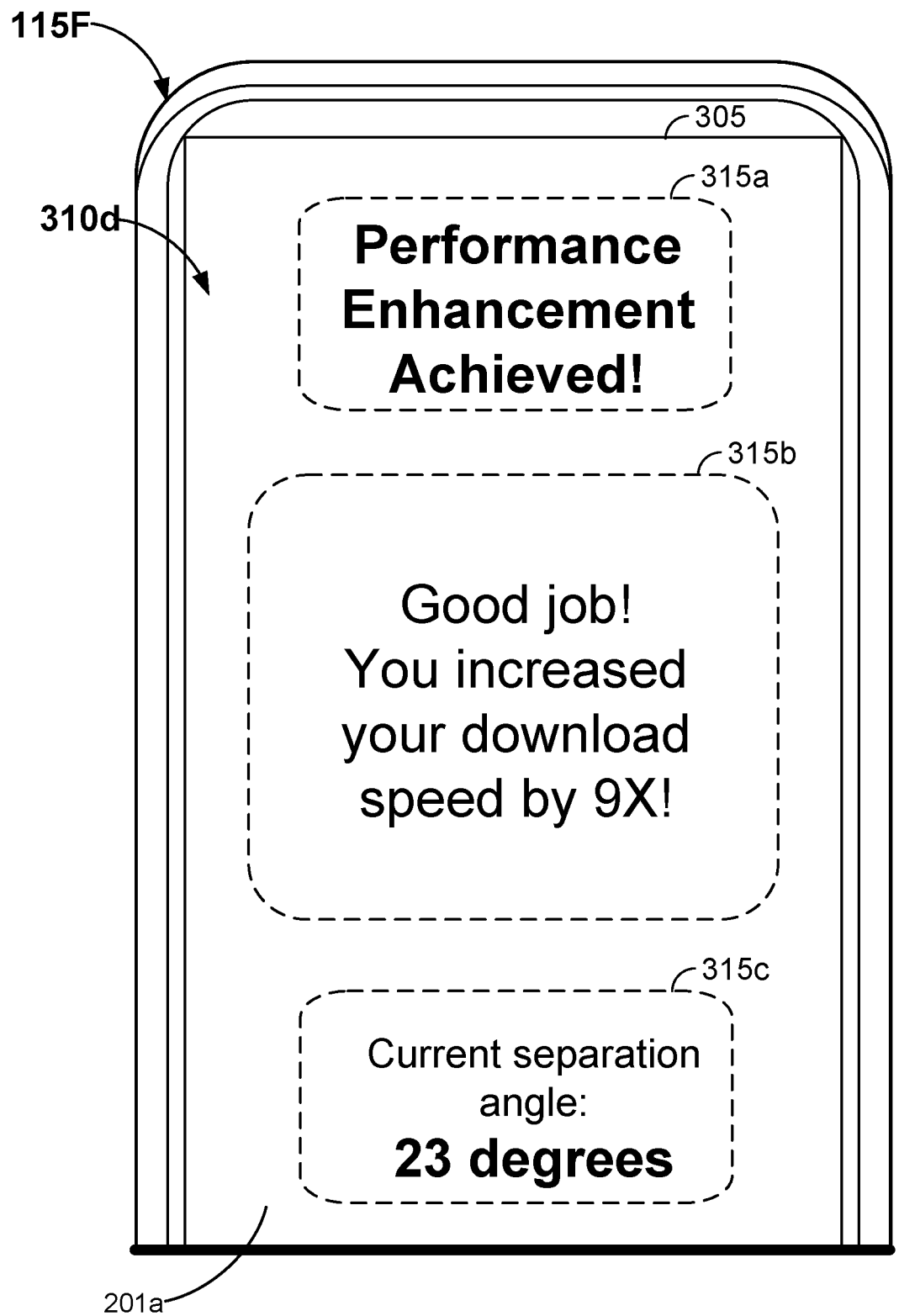
FIG. 3D illustrates additional examples of user prompts that may be provided by a foldable UE.

FIG. 3D illustrates additional examples of user prompts that may be provided by a foldable UE. In this example, the GUI 310d includes visual prompts presented in areas 315a, 315*b* and 315*c* of the display device 305. In some instances, the GUI 310*d* may be presented after the GUI 310*c* of FIG. 3C. According to this example, the GUI 310*d* is being presented associated with a user having decreased the separation angle between the first portion 201*a* and the second portion 201*b* of the foldable UE 115F from 94 degrees to 23 degrees.

According to this example, a textual user prompt is being presented in area 315*a* indicating that some type of performance enhancement has been achieved. According to this example, area 315*b* includes another textual user prompt indicating details of the performance enhancement (in this example, a 9× increase in download speed). In this example, area 315*c* indicates that the current separation angle between the first portion 201*a* and the second portion 201*b* is 23 degrees.

In some examples, receiving the indication may involve receiving a blockage indication to move at least a portion of a user's hand or body away from at least a portion the foldable UE 115F. In some implementations, the foldable UE 115F may include a touch or a capacitive sensor system. The blockage indication may be associated with receiving touch sensor data from the touch sensor system. The touch sensor data may indicate a touch in an area of the foldable UE 115F, such as an area corresponding to one or more antenna modules the foldable UE 115F (such as one or more of the antenna modules 205*a*-205*c* shown in FIG. 2). Alternatively, or additionally, the blockage indication may be associated with receiving, via one or more antenna modules, one or more radio frequency (RF) signals reflected from at least the portion of the user's hand or body. According to some such examples, the reflected RF signals may correspond with RF signals transmitted by one of the one or more antenna modules that receive the reflected RF signals. In some examples, a control system of the foldable UE 115F may be configured to control a user interface system of the foldable UE 115F to provide a prompt to move at least the portion of the user's hand or body away from at least the portion of the foldable UE.

Figure 3E:
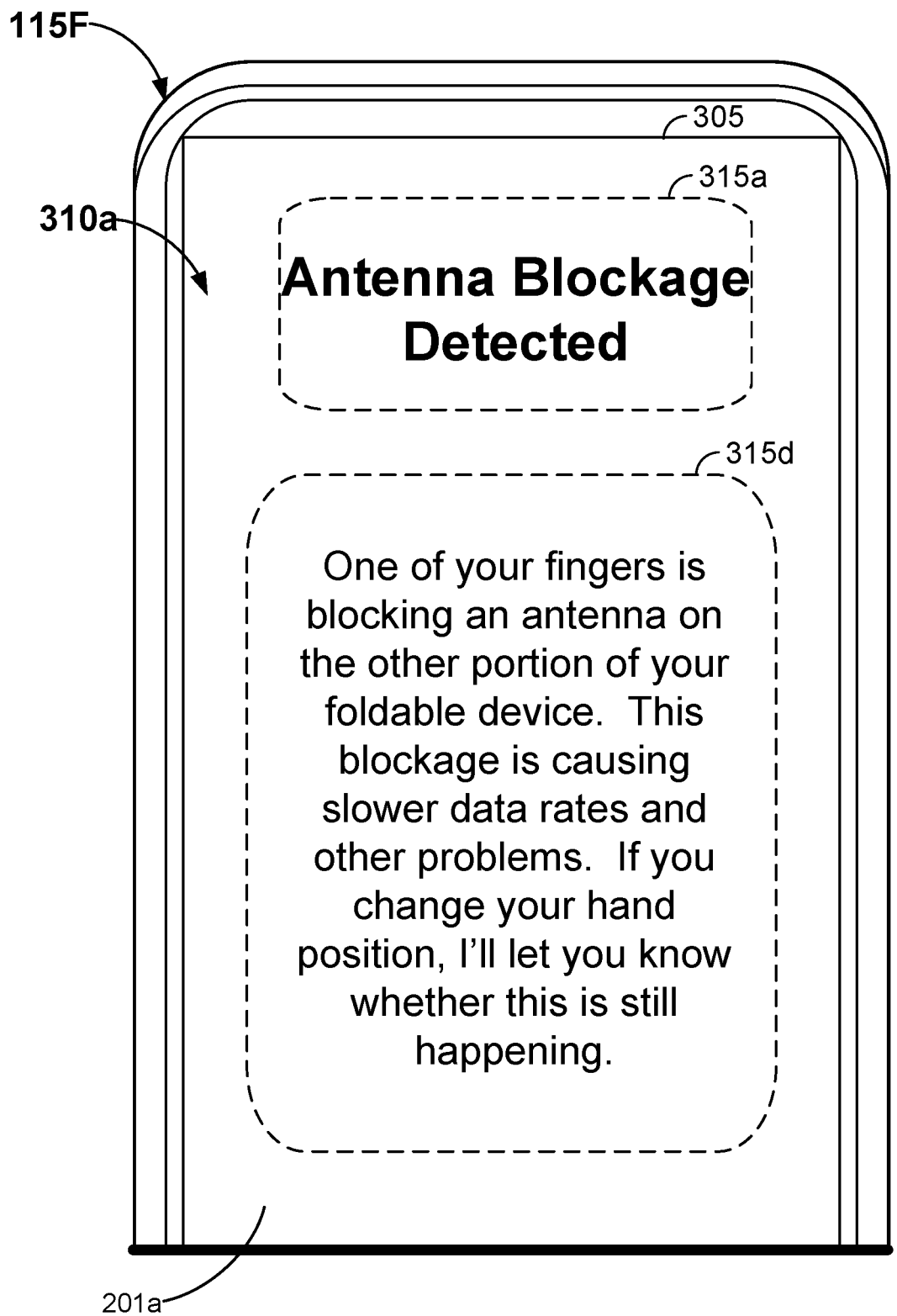
FIG. 3E illustrates examples of user prompts that may be provided by a foldable UE associated with a blockage indication.

FIG. 3E illustrates examples of user prompts that may be provided by a foldable UE associated with a blockage indication. In this example, the GUI 310*e* includes visual prompts presented in areas 315*a* and 315*d* of the display device 305. According to this example, the user prompts are associated with receipt of a blockage indication. In this example, a textual user prompt is being presented in area 315*a* indicating that antenna blockage has been detected. According to this example, further details regarding the antenna blockage and a prompt to change the user's hand position are presented in area 315*d*. The text in area 315*d* also indicates that the foldable UE 115F will provide updates regarding the blockage condition associated with an indication that the user has changed the hand position.

Figure 3F:
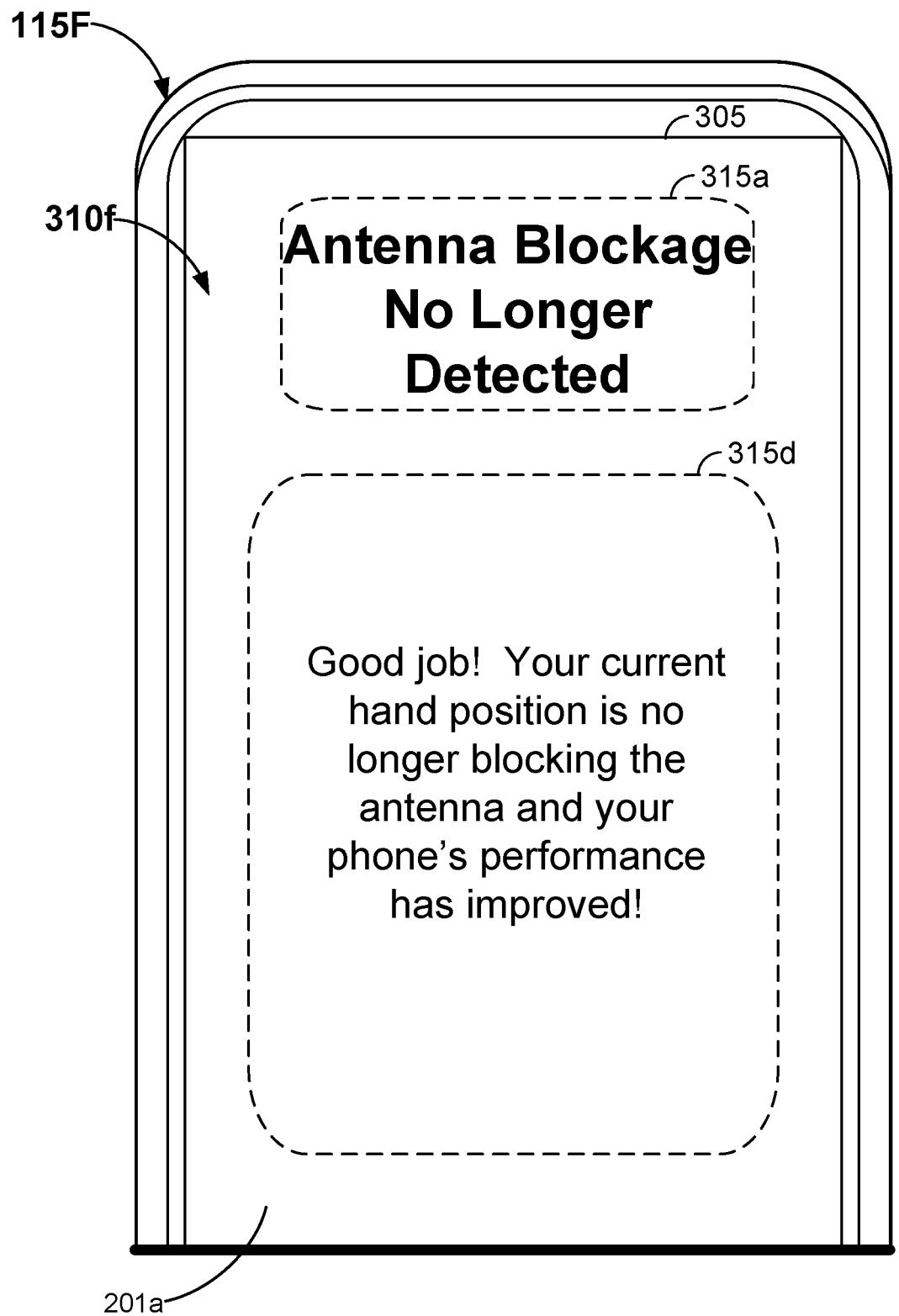
FIG. 3F illustrates additional examples of user prompts that may be provided by a foldable UE.

FIG. 3F illustrates additional examples of user prompts that may be provided by a foldable UE. In this example, the GUI 310*f* includes visual prompts presented in areas 315*a* and 315*d* of the display device 305. In some instances, the GUI 310*b* may be presented after the GUI 310*a* of FIG. 3A. According to this example, the GUI 310*f* is being presented associated with receiving an indication that the antenna blockage has ceased. In this example, a textual user prompt is being presented in area 315*a* indicating that some type of performance enhancement has been achieved, which in this example corresponds to the antenna blockage having ceased. According to this example, text is being presented in area 315*d* praising the user and including an indication that the performance of the foldable UE 115F has improved in some non-specified manner due to the cessation of antenna blockage. In some alternative examples, the GUI 310*f* may provide details about the performance enhancement, as compared to performance of the foldable UE 115F when one or more antenna modules were blocked.

Figure 3G:
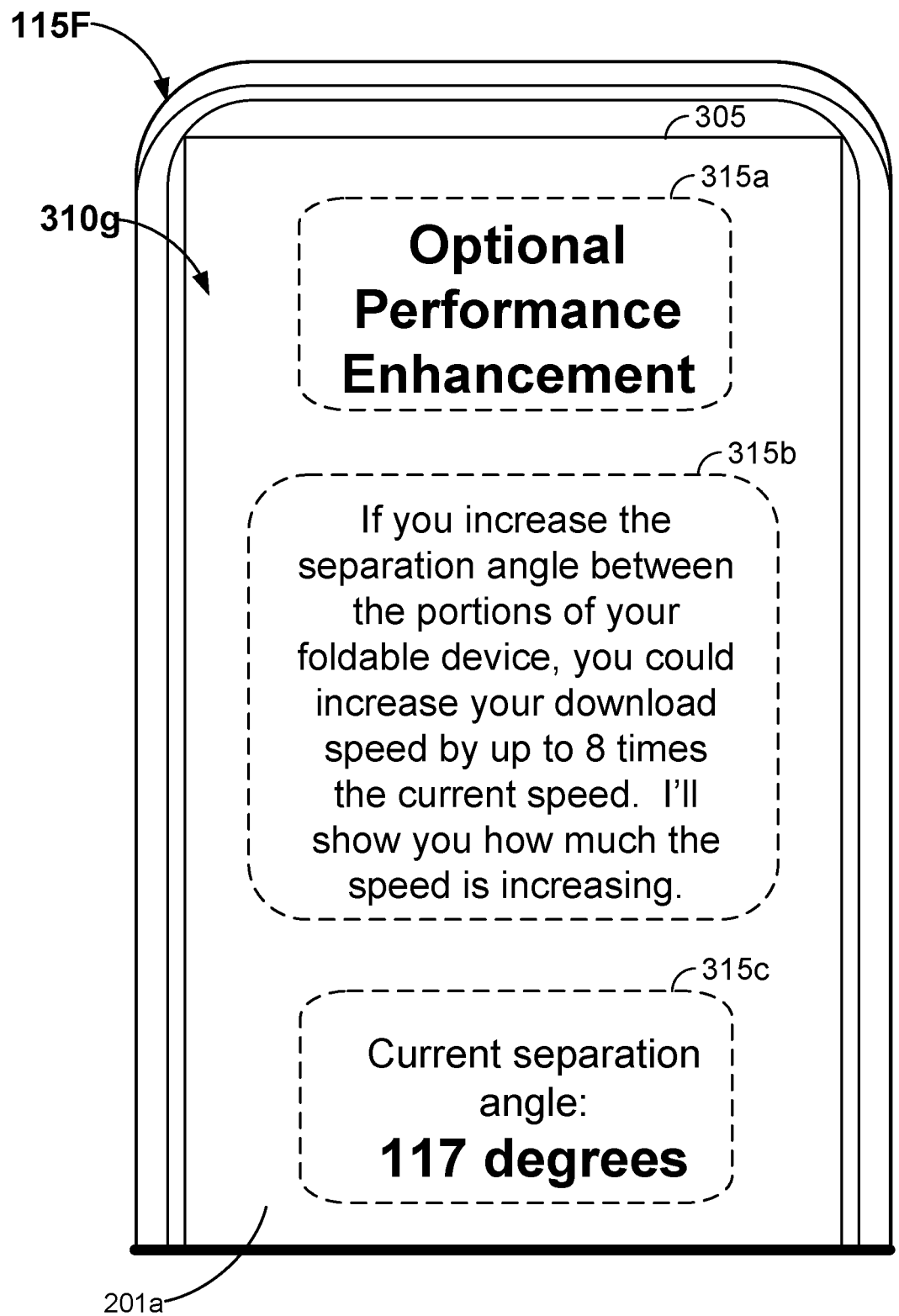
FIG. 3G illustrates additional examples of user prompts that may be provided by a foldable UE.

FIG. 3G illustrates additional examples of user prompts that may be provided by a foldable UE. In this example, the GUI 310*g* includes visual prompts presented in areas 315*a*, 315*b* and 315*c* of the display device 305. According to this example, the user prompts are associated with receipt of an indication to change a separation angle between the first portion and the second portion. In this example, the user prompts are associated with receipt of an indication to increase a separation angle between the first portion and the second portion. In some such examples, the user prompts may be associated with receipt of an indication relating to the reception of wireless signals, such as millimeter wave signals, measurements relating to a downlink data rate, or a combination thereof. For example, the user prompts may be associated with measurements by the foldable UE 115F relating to the reception of wireless signals, such as millimeter wave signals.

According to this example, area 315*a* includes a textual user prompt indicating an optional performance enhancement. In this example, area 315*b* includes another textual user prompt indicating details of how to attain the optional performance enhancement referenced in the area 315*a*: here, a message is presented in area 315*b* indicating that if the user increases the separation angle between portions of the foldable UE 115F, the download speed provided by the foldable UE 115F could increase by up to 8 times the current speed. In this example, area 315*c* indicates that the current separation angle is 94 degrees.

In this example, the GUI 310*g* also presents information in area 315*b* indicating that the foldable UE 115F will present information indicating how download speed increases responsive to changes in the separation angle. According to this example, the user is not presented with a specific separation angle target, or a range of separation angles for the user to target.

Figure 3H:
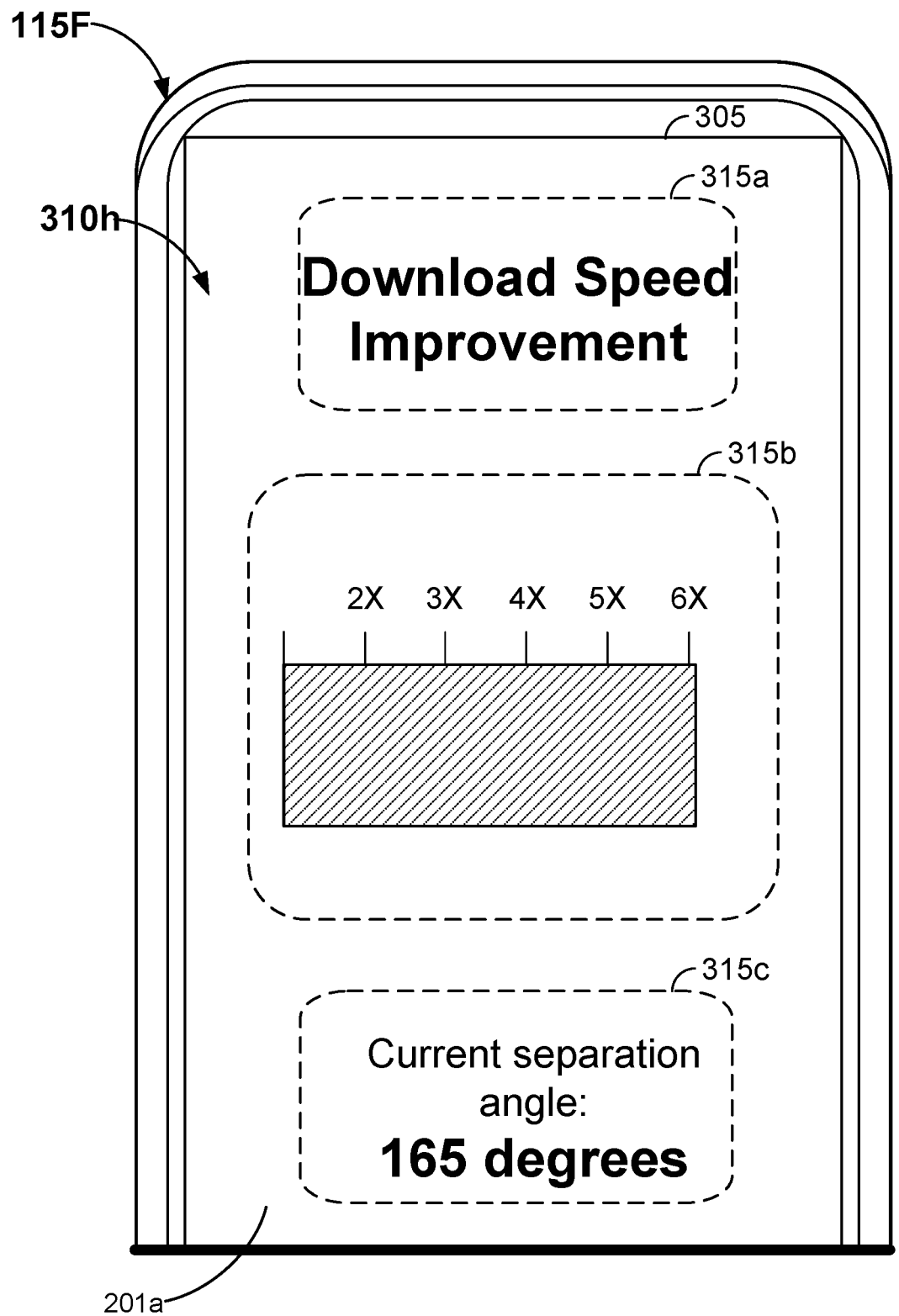
FIG. 3H illustrates additional examples of user prompts that may be provided by a foldable UE.

FIG. 3H illustrates additional examples of user prompts that may be provided by a foldable UE. In this example, the GUI 310*h* includes visual prompts presented in areas 315*a*, 315*b* and 315*c* of the display device 305. In some instances, the GUI 310*h* may be presented after the GUI 310*g* of FIG. 3G. According to this example, the GUI 310*b* is being presented associated with a user having increased the separation angle between the first portion 201*a* and the second portion 201*b* of the foldable UE 115F from 117 degrees to 165 degrees.

In this example, area 315*c* indicates that the current separation angle between the first portion 201*a* and the second portion 201*b* is 165 degrees. According to this example, a textual user prompt is being presented in area 315*a* indicating that a type of performance enhancement has been achieved. In this example, the performance enhancement includes an increase in download speed. According to this example, area 315*b* includes a bar graph that indicates details of the increase in download speed at a separation angle of 165 degrees, relative to the prior download speed at a separation angle of 117 degrees.

According to some examples, receiving the indication may be associated with an orientation indication to change the UE orientation of at least a portion of the foldable UE 115F relative to a reference plane. In some such examples, the prompt may include a prompt to change the UE orientation. For example, receiving the indication may involve receiving an orientation indication from an orientation sensing system. The prompt may, in some examples, include a GUI that is similar to the GUI 310a of FIG. 3A, the GUI 310c of FIG. 3C or the GUI 310g of FIG. 3G, except referring to a change in orientation rather than (or in addition to) a change in separation angle. One or more additional GUIs may be presented associated with an indication that the orientation of at least a portion of the foldable UE 115F has been changed, relative to a reference plane. In some implementations, similar GUIs may be presented associated with receiving positioning measurement data.

Figure 4:
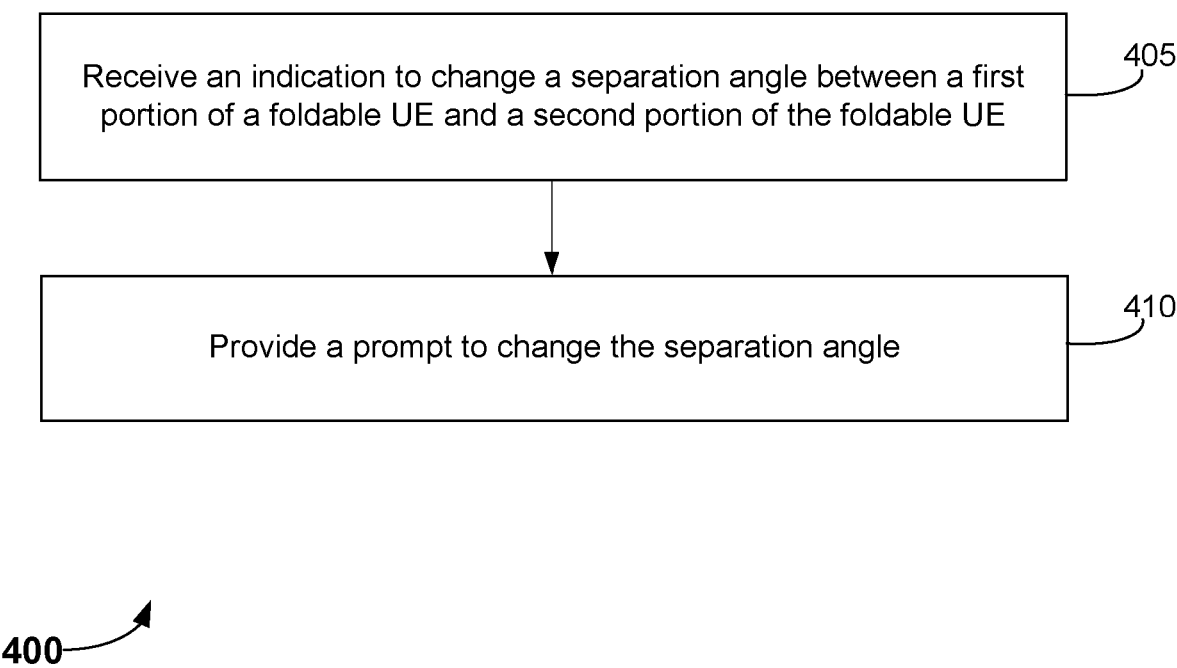
FIG. 4 illustrates an example process that may be performed by a foldable UE.

FIG. 4 illustrates an example process that may be performed by a foldable UE. In some such examples, the process 400 may be performed by a foldable UE 115F such as one of those disclosed herein, such as illustrated by and described with reference to FIGS. 1-3H. According to some examples, the process 400 may be performed by an apparatus 600 as illustrated by and described with reference to FIG. 6. In some such examples, the process 400 may be performed, at least in part, by the control system 610 and the interface system 605 of FIG. 6. Although FIG. 4 shows example blocks of the process 400, in some aspects, the process 400 may include additional blocks, fewer blocks, different blocks, or differently arranged blocks than those depicted in FIG. 4. Additionally, or alternatively, in some examples two or more of the blocks of the process 400 may be performed in parallel. The process 400 may include additional aspects, such as any single aspect or any combination of aspects described herein or in connection with one or more other processes described elsewhere herein.

According to this example, block 405 involves receiving (for example, by a control system) an indication to change a separation angle between a first portion of the foldable UE and a second portion of the foldable UE. In some examples, the indication may be associated with transmission of signals, reception of signals, or a combination thereof. According to some such examples, the indication may be associated with transmission of millimeter wave signals, reception of millimeter wave signals, or a combination thereof. In some instances, the indication may be associated with a downlink data rate, an uplink data rate, or a combination thereof. According to some examples, block 405 may involve receiving a quality of service indication.

In some examples, block 405 may involve receiving beam training measurement data. According to some such examples, receiving the beam training measurement data may involve receiving first beam training measurement data from the first portion of the foldable UE and receiving second beam measurement data from the second portion of the foldable UE at each of a plurality of separation angles. In some examples, the beam training measurement data may be received via each antenna module of a plurality of antenna modules of the foldable UE.

According to some examples, block 405 may involve receiving positioning measurement data. Some such examples may involve receiving positioning measurement data at, or corresponding to, each separation angle of a plurality of separation angles. Some examples may involve receiving positioning measurement data via each antenna module of a plurality of antenna modules of the foldable UE.

In this example, block 410 involves providing a prompt to change the separation angle. The prompt may be a visual prompt, an audio prompt, a sensory output, or a combination thereof. In some examples, the prompt may be provided, at least in part, via a GUI such as the GUIs 301a-310h of FIGS. 3A-3H. In some examples, the foldable UE may include a user interface system and block 410 may involve providing the prompt via the user interface system. According to some such examples, a control system of the foldable UE may control the user interface system to provide the prompt.

In some examples, the indication of block 405 may be, or may include, an orientation indication to change a UE orientation of at least a portion of the foldable UE relative to a reference plane. In some such examples, block 410 may involve providing a prompt to change the UE orientation.

In some examples, the indication of block 405 may be, or may include, a blockage indication to move at least a portion of a user's hand or body away from at least a portion the foldable UE. In some such examples, block 410 may involve providing a prompt to move at least the portion of the user's hand or body away from at least the portion of the foldable UE.

In some implementations a foldable UE 115F may request information from one or more components of a BS 105, such as measurement information. In some examples, the measurement information may relate to beamforming. In order to implement beamforming, a UE needs to set the beam weights in order to pick up the received energy corresponding to a particular beam direction. A foldable UE 115F may have calculated or ascertained these beam weights prior to being folded. For example, referring again to FIG. 2, the foldable UE 115F may have calculated or ascertained such beam weights prior to being folded, which will involve changing the separation angle $\Theta$ between the first portion 201a and the second portion 201b. Changing the separation angle will cause the orientation of at least one of the antenna modules 205a and 205c. Used individually, the beam weights for at least one of antenna modules 205a and 205c may, in some instances, still be acceptable after changing the separation angle $\Theta$. However, after changing the separation angle $\Theta$, calculating or ascertaining the optimal beam weights for using antenna modules 205a and 205c together may require beam training. The foldable UE 115F may need reference signal measurement specifications to be provided by at least one portion of the BS 105 in order to calculate or ascertain the optimal beam weights for using antenna modules 205a and 205c together. Accordingly, some aspects of the present disclosure relate to one or more components of a BS 105 and processes that may be performed by one or more components of a BS 105.

Figure 5:
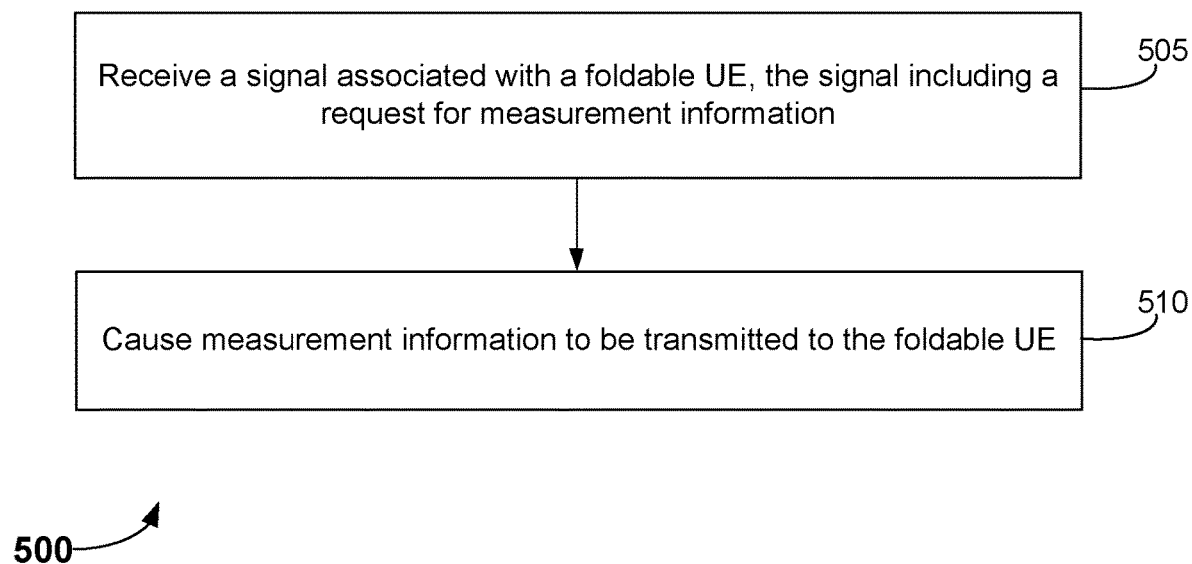
FIG. 5 illustrates an example process that may be performed by a network entity.

FIG. 5 illustrates an example process that may be performed by a network entity. In some such examples, the process 500 may be performed (at least in part) by a BS 105 such as one of those disclosed herein. One or more components of the BS 105 may be an example of one or more components of a BS 105 such as illustrated by and described with reference to FIG. 1. In some implementations, the network entity may be implemented in a disaggregated base station architecture. According to some such implementations, the network entity may be, or may include, one or more of a CU, a DU, an RU, a Near-RT RIC, or a Non-RT RIC. Although FIG. 5 shows example blocks of the process 500, in some aspects, the process 500 may include additional blocks, fewer blocks, different blocks, or differently arranged blocks than those depicted in FIG. 5. Additionally, or alternatively, in some examples two or more of the blocks of the process 500 may be performed in parallel. The process 500 may include additional aspects, such as any single aspect or any combination of aspects described herein or in connection with one or more other processes described elsewhere herein.

According to this example, block 505 involves receiving a signal associated with a foldable UE. In this example, the signal includes a request for measurement information. In some examples, the measurement information may be, or may include, reference signal measurement information. In some examples, the signal associated with the foldable UE may be, may include, or may correspond with, an over-the-air (OTA) signal transmitted by the foldable UE.

According to some examples, the signal associated with the foldable UE may be related to changing the separation angle between a first portion and the first portion 201a and the second portion 201b of a foldable UE 115F such as that described with reference to FIG. 2. Block 505 may involve receiving the signal directly or indirectly from the foldable UE 115F, depending on the particular implementation. For example, the signal associated with the foldable UE may be directly received by an RU. Block 505 may, in some examples, involve the receipt of the signal by another network entity from the RU, in some instances via a fronthaul link.

In this example, block 510 involves causing measurement information to be transmitted to the foldable UE 115F. In some such examples, the measurement information may be associated with beam training to be performed by the foldable UE. The beam training may, for example, involve calculating or ascertaining beam weights for using multiple antenna arrays together for beam forming. One or more of the antenna arrays may reside in a different portion of the foldable UE from one or more of the other antenna arrays. The measurement information may be, or may include, a particular CSI-RS allocated for such measurements. In some other examples, the measurement information may be associated other measurements to be performed by the foldable UE.

FIG. 6 illustrates an example apparatus that supports functionality of a foldable UE. In some examples the apparatus 600 may be a foldable UE 115F, such as one of the foldable UEs 115 illustrated by and described with reference to FIGS. 2-3H. In some other examples the apparatus 600 may correspond with one or more elements of a BS, such as one of the BSs 105 disclosed herein. One or more components of the BS 105 may be an example of one or more components of a BS 105 such as illustrated by and described with reference to FIG. 1.

In this example, the apparatus 600 includes an interface system 605 and a control system 610. In some examples, the apparatus 600 may include a memory system 615 that is separate from, but configured for communication with, the control system 610.

In this example, the interface system 605 includes a wireless interface system configured for communication with other devices. In some implementations, the wireless interface system may include a single antenna, or a single antenna module. However, in some other implementations, the wireless interface system may include more than one antenna, or more than one antenna module, which may be capable of concurrently transmitting or receiving multiple wireless transmissions.

In some examples, the wireless interface system may include a transceiver. In some implementations, the transceiver may communicate bi-directionally, via the one or more antennas, wired, or wireless links as described herein. For example, the transceiver may represent a wireless transceiver and may communicate bi-directionally with another wireless transceiver. The transceiver also may include a modem to modulate the packets, to provide the modulated packets to one or more antennas for transmission, and to demodulate packets received from the one or more antennas. Accordingly, while the control system 610 and the interface system 605 are shown as separate elements in FIG. 6, in some implementations the interface system 605 may include some elements of the control system 610, or vice versa.

In some implementations, the transceiver may include one or more interfaces, such as one or more interfaces coupled with the one or more antennas that are configured to support various receiving or obtaining operations, or one or more interfaces coupled with the one or more antennas that are configured to support various transmitting or outputting operations, or a combination thereof. In some implementations, the transceiver may include or be configured for coupling with one or more processors or memory components that are operable to perform or support operations based on or associated with received or obtained information or signals, or to generate information or other signals for transmission or other outputting, or any combination thereof. In some implementations, the transceiver, or the transceiver and the one or more antennas, or the transceiver and the one or more antennas and one or more processors or memory components, may be included in a chip or chip assembly that is installed in the apparatus 600.

In some implementations, the interface system 605 may include a user interface system, one or more network interfaces, one or more interfaces between the control system 610 and the memory system 615, one or more external device interfaces (for example, ports or applications processors), or combinations thereof.

The interface system 605 may be configured to provide communication (which may include wired or wireless communication, electrical communication, radio communication, etc.) between components of the apparatus 600. In some such examples, the interface system 605 may be configured to provide communication between components of the control system 610, for example via electrically conducting material (for example, via conductive metal wires or traces). According to some examples, the interface system 605 may be configured to provide communication between the apparatus 600 and human beings. In some such examples, the interface system 605 may include one or more user interfaces, such as one or more loudspeakers, one or more displays, a haptic feedback system, a touch sensor system, or combinations thereof. The interface system 605 may, in some examples, include one or more external device interfaces (such as one or more universal serial bus (USB) interfaces or a serial peripheral interface (SPI)).

The control system 610 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 610 also may include one or more memory devices, such as one or more random access memory (RAM) devices, read-only memory (ROM) devices, etc. In this example, the control system 610 is configured for communication with, and for controlling, at least some components of the interface system 605. In implementations where the apparatus includes a memory system 615 that is separate from the control system 610, the control system 610 also may be configured for communication with the memory system 615.

The control system 610 may include components for bi-directional voice and data communications, such as components for transmitting and receiving communications. In some implementations, the control system 610 may include a communications manager and an input/output (I/O) controller.

The I/O controller may manage input and output signals for the apparatus 600. The I/O controller also may manage peripherals not integrated into the apparatus 600. In some implementations, the I/O controller may represent a physical connection or port to an external peripheral. In some implementations, the I/O controller may utilize an operating system such as iOS®, ANDROID®, MS-DOS®, MS-WINDOWS®, OS/2®, UNIX®, LINUX®, or another known operating system. Additionally, or alternatively, the I/O controller may represent or interact with a modem, a keyboard, a mouse, a touchscreen, or a similar device. In some implementations, the I/O controller may be implemented as part of a processor or processing system. In some implementations, a user may interact with the apparatus 600 via the I/O controller or via hardware components controlled by the I/O controller.

The communications manager (or one of more other components of the control system 610) may support wireless communication at a UE in accordance with examples as disclosed herein. For example, the communications manager (or one of more other components of the control system 610) may be configured to support mobility between NR SA and NSA modes.

In some examples, the memory system 615 may include one or more memory devices, such as one or more RAM devices, ROM devices, etc. In some implementations, the memory system 615 may include one or more computer-readable media, or storage media. Computer-readable media include both computer storage media and communication media including any medium that may be enabled to transfer a computer program from one place to another. Storage media may be any available media that may be accessed by a computer. In some examples, the memory system 615 may include one or more non-transitory media. By way of example, and not limitation, non-transitory media may include RAM, ROM, electrically erasable programmable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

In some examples, the apparatus 600 may include an orientation sensing system 620. In some foldable UE implementations, the orientation sensing system 620 may be configured for sensing an orientation of at least a portion of the foldable UE relative to a local reference plane or a global reference plane. The orientation sensing system 620 may, in some such implementations, include one or more gyroscopes, accelerometers, or combinations thereof. In some implementations, the orientation sensing system 620 may include one or more magnetometers. Referring to FIG. 2, in some examples the apparatus may be a foldable UE 115F and the first portion 201a and the second portion 201b each may include a portion of the orientation sensing system 620. In some such examples, the orientation sensing system may be configured to estimate or calculate the separation angle Θ. According to some examples, the control system 610 may be configured to estimate or calculate the separation angle Θ according to signals from the orientation sensing system 620. In some examples, the control system 610 may be configured to estimate or calculate the orientation of at least a portion of the foldable UE 115F relative to at least a portion of the reference coordinate system 203a (such as a reference plane of the reference coordinate system 203a) according to signals from the orientation sensing system 620.

In some examples in which the apparatus 600 is a foldable UE 115F, the control system 610 may be configured to obtain (for example, via the interface system 605) an indication to change a separation angle between a first portion and a second portion of the foldable UE. In some examples, the indication may be associated with transmission of millimeter wave signals, reception of millimeter wave signals, or a combination thereof. In some examples, the indication may be associated with a downlink data rate, an uplink data rate, or a combination thereof. In some examples, the foldable UE may be configured to provide a prompt to change the separation angle.

According to some examples, the interface system 605 may include a user interface system. Providing the prompt may involve providing a visual prompt, providing an audio prompt, providing a sensory output, or a combination thereof, via the user interface system. In some such examples, the control system 610 may be configured to control the interface system 605 to provide the prompt.

As noted above, in some examples the apparatus 600 may include an orientation sensing system 620. The orientation sensing system 620 may be coupled to the interface system. In some examples, the orientation sensing system 620 may be configured for sensing a UE orientation of at least a portion of the foldable UE relative to a reference plane. In some such examples, obtaining the indication may involve obtaining an orientation indication to change the UE orientation of at least the portion of the foldable UE relative to the reference plane. In some such examples, the control system 610 may be further configured to provide a prompt to change the UE orientation.

In some examples, the indication may be, or may include, a blockage indication to move at least a portion of a user's hand or body away from at least a portion the foldable UE. In some such examples, the control system 610 may be further configured to provide a prompt to move at least the portion of the user's hand or body away from at least the portion of the foldable UE.

In some instances, obtaining the indication may involve obtaining beam training measurement data. Some such instances may involve obtaining first beam training measurement data from the first portion and obtaining second beam measurement data from the second portion at each separation angle of a plurality of separation angles. In some implementations, the interface system 605 may include a plurality of antenna modules. In some such implementations, obtaining the beam training measurement data may involve obtaining the beam training measurement data via each antenna module of the plurality of antenna modules.

According to some examples, the indication may be associated with positioning accuracy. In some such examples, obtaining the indication may involve obtaining positioning measurement data. In some examples, obtaining the positioning measurement data may involve obtaining the positioning measurement data at each separation angle of a plurality of separation angles. According to some implementations in which the interface system 605 includes a plurality of antenna modules, obtaining the positioning measurement data may involve obtaining the positioning measurement data via each antenna module of the plurality of antenna modules. In some examples, obtaining the indication may involve obtaining a quality of service indication.

Implementation examples are described in the following numbered clauses:

1. A foldable user equipment (UE), including: a first portion, a second portion, an interface system and a control system coupled to the interface system and configured to:

obtain an indication to change a separation angle between the first portion and the second portion; and provide a prompt to change the separation angle.

2. The UE of clause 1, where the interface system includes a user interface system and where providing the prompt involves providing a visual prompt, providing an audio prompt, providing a sensory output, or a combination thereof, via the user interface system.

The foldable UE of clause 1 or clause 2, also including an orientation sensing system coupled to the interface system, the orientation sensing system configured for sensing a UE orientation of at least a portion of the foldable UE relative to a reference plane, where obtaining the indication involves obtaining an orientation indication to change the UE orientation of at least the portion of the foldable UE relative to the reference plane and where the control system is further configured to provide a prompt to change the UE orientation.

4. The foldable UE of any one of clauses 1-3, where obtaining the indication involves obtaining a blockage indication to move at least a portion of a user's hand or body away from at least a portion the foldable UE and where the control system is further configured to provide a prompt to move at least the portion of the user's hand or body away from at least the portion of the foldable UE.

5. The foldable UE of any one of clauses 1-4, where the indication is associated with transmission of millimeter wave signals, reception of millimeter wave signals, or a combination thereof.

6. The foldable UE of any one of clauses 1-5, where the indication is associated with a downlink data rate, an uplink data rate, or a combination thereof.

7. The foldable UE of any one of clauses 1-6, where obtaining the indication involves obtaining beam training measurement data.

8. The foldable UE of clause 7, where obtaining the beam training measurement data involves obtaining first beam training measurement data from the first portion and obtaining second beam measurement data from the second portion at each separation angle of a plurality of separation angles.

9. The foldable UE of clause 7 or clause 8, where the interface system involves a plurality of antenna modules and where obtaining the beam training measurement data involves obtaining the beam training measurement data via each antenna module of the plurality of antenna modules.

10. The foldable UE of any one of clauses 1-9, where the indication is associated with positioning accuracy.

11. The foldable UE of clause 10, where obtaining the indication involves obtaining positioning measurement data.

12. The foldable UE of clause 11, where obtaining the positioning measurement data involves obtaining the positioning measurement data at each separation angle of a plurality of separation angles.

13. The foldable UE of clause 11 or clause 12, where the interface system includes a plurality of antenna modules and where obtaining the positioning measurement data involves obtaining the positioning measurement data via each antenna module of the plurality of antenna modules.

14. The foldable UE of any one of clauses 1-13, where obtaining the indication involves obtaining a quality of service indication.

15. A method of wireless communication by a foldable user equipment (UE), involving: receiving an indication to change a separation angle between a first portion of the foldable UE and a second portion of the foldable UE; and providing a prompt to change the separation angle.

16. The method of clause 15, where providing the prompt involves providing a visual prompt, providing an audio prompt, providing a sensory output, or a combination thereof.

17. The method of clause 15 or clause 16, where receiving the indication involves receiving an orientation indication to change a UE orientation of at least a portion of the foldable UE relative to a reference plane and where the method further involves providing a prompt to change the UE orientation.

18. The method of any one of clauses 15-17, where receiving the indication involves receiving a blockage indication to move at least a portion of a user's hand or body away from at least a portion the foldable UE and where the method further involves providing a prompt to move at least the portion of the user's hand or body away from at least the portion of the foldable UE.

19. The method of any one of clauses 15-18, where the indication is associated with transmission of millimeter wave signals, reception of millimeter wave signals, or a combination thereof.

20. The method of any one of clauses 15-19, where the indication is associated with a downlink data rate, an uplink data rate, or a combination thereof.

21. The method of any one of clauses 15-20, where receiving the indication involves receiving beam training measurement data.

22. The method of clause 21, where receiving the beam training measurement data involves receiving first beam training measurement data from the first portion and receiving second beam measurement data from the second portion at each separation angle of a plurality of separation angles.

23. The method of clause 21 or clause 22, where receiving the beam training measurement data involves receiving the beam training measurement data via each antenna module of a plurality of antenna modules of the foldable UE.

24. The method of any one of clauses 15-23, where the indication is associated with positioning accuracy.

25. The method of clause 24, where receiving the indication involves receiving positioning measurement data.

26. The method of clause 25, where receiving the positioning measurement data involves receiving the positioning measurement data at each separation angle of a plurality of separation angles.

27. The method of clause 25 or clause 26, where receiving the positioning measurement data involves receiving the positioning measurement data via each antenna module of a plurality of antenna modules of the foldable UE.

28. The method of any one of clauses 15-27, where receiving the indication involves receiving a quality of service indication.

29. A foldable user equipment (UE), including:

As used herein, the term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory), obtaining, and the like. Also, "determining" can include resolving, selecting, choosing, establishing, estimating, calculating, ascertaining and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described herein as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described herein should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. A foldable user equipment (UE), comprising:
a first portion;
a second portion;
an interface system including a user interface system; and
a control system coupled to the interface system and configured to:
obtain an indication to change a separation angle between the first portion and the second portion, wherein the indication is associated with transmission of millimeter wave signals, reception of millimeter wave signals, or a combination thereof; and
provide, via the user interface system, a user prompt to change the separation angle.

2. The foldable UE of claim 1, wherein providing the user prompt comprises providing a visual prompt, providing an audio prompt, providing a sensory output, or a combination thereof, via the user interface system.

3. The foldable UE of claim 1, further comprising an orientation sensing system coupled to the interface system, the orientation sensing system configured for sensing a UE orientation of at least a portion of the foldable UE relative to a reference plane, wherein obtaining the indication involves obtaining an orientation indication to change the UE orientation of at least the portion of the foldable UE relative to the reference plane and wherein the control system is further configured to provide a prompt to change the UE orientation.

4. The foldable UE of claim 1, wherein obtaining the indication involves obtaining a blockage indication associated with at least partial blockage of the transmission of millimeter wave signals, the reception of millimeter wave signals, or a combination thereof caused by at least a portion of a user's hand or body and wherein the control system is further configured to provide a user prompt to move at least the portion of the user's hand or body away from at least a portion of the foldable UE.

5. The foldable UE of claim 1, wherein the indication is associated with a downlink data rate, an uplink data rate, or a combination thereof.

6. The foldable UE of claim 1, wherein obtaining the indication comprises obtaining beam training measurement data.

7. The foldable UE of claim 6, wherein obtaining the beam training measurement data involves obtaining first beam training measurement data from the first portion and obtaining second beam measurement data from the second portion at each separation angle of a plurality of separation angles.

8. The foldable UE of claim 6, wherein the interface system comprises a plurality of antenna modules and wherein obtaining the beam training measurement data involves obtaining the beam training measurement data via each antenna module of the plurality of antenna modules.

9. The foldable UE of claim 1, wherein the indication is associated with positioning accuracy.

10. The foldable UE of claim 9, wherein obtaining the indication comprises obtaining positioning measurement data.

11. The foldable UE of claim 10, wherein obtaining the positioning measurement data involves obtaining the positioning measurement data at each separation angle of a plurality of separation angles.

12. The foldable UE of claim 10, wherein the interface system comprises a plurality of antenna modules and wherein obtaining the positioning measurement data involves obtaining the positioning measurement data via each antenna module of the plurality of antenna modules.

13. The foldable UE of claim 1, wherein obtaining the indication comprises obtaining a quality of service indication.

14. A method of wireless communication by a foldable user equipment (UE), comprising:
receiving, by the UE, an indication to change a separation angle between a first portion of the foldable UE and a second portion of the foldable UE, wherein the indication is associated with transmission of millimeter wave signals, reception of millimeter wave signals, or a combination thereof; and
providing, by the UE, a user prompt to change the separation angle.

15. The method of claim 14, wherein providing the user prompt comprises providing a visual prompt, providing an audio prompt, providing a sensory output, or a combination thereof.

16. The method of claim 14, wherein receiving the indication involves receiving an orientation indication to change a UE orientation of at least a portion of the foldable UE relative to a reference plane and wherein the method further comprises providing a user prompt to change the UE orientation.

17. The method of claim 14, wherein receiving the indication involves receiving a blockage indication associated with at least partial blockage of the transmission of millimeter wave signals, the reception of millimeter wave signals, or a combination thereof caused by at least a portion of a user's hand or body and wherein the method further comprises providing a user prompt to move at least the portion of the user's hand or body away from at least a portion of the foldable UE.

18. The method of claim 14, wherein the indication is associated with a downlink data rate, an uplink data rate, or a combination thereof.

19. The method of claim 14, wherein receiving the indication comprises receiving beam training measurement data.

20. The method of claim 19, wherein receiving the beam training measurement data involves receiving first beam training measurement data from the first portion and receiving second beam measurement data from the second portion at each separation angle of a plurality of separation angles.

21. The method of claim 19, wherein receiving the beam training measurement data involves receiving the beam training measurement data via each antenna module of a plurality of antenna modules of the foldable UE.

22. The method of claim 14, wherein the indication is associated with positioning accuracy.

23. The method of claim 22, wherein receiving the indication comprises receiving positioning measurement data.

24. The method of claim 23, wherein receiving the positioning measurement data involves receiving the positioning measurement data at each separation angle of a plurality of separation angles.

25. The method of claim 23, wherein receiving the positioning measurement data involves receiving the positioning measurement data via each antenna module of a plurality of antenna modules of the foldable UE.

26. The method of claim 14, wherein receiving the indication comprises receiving a quality of service indication.

27. A foldable user equipment (UE), comprising:
means for obtaining, by the UE, an indication to change a separation angle between a first portion of the foldable UE and a second portion of the foldable UE, wherein the indication is associated with transmission of millimeter wave signals, reception of millimeter wave signals, or a combination thereof; and
means for providing, by the UE, a user prompt to change the separation angle.

28. The foldable UE of claim 27, wherein the means for providing the user prompt comprises means for providing a visual prompt, means for providing an audio prompt, means for providing a sensory output, or a combination thereof.

* * * * *